United States Patent
Lu et al.

(10) Patent No.: US 10,180,843 B2
(45) Date of Patent: Jan. 15, 2019

(54) RESOURCE PROCESSING METHOD AND DEVICE FOR A MULTI-CORE OPERATING SYSTEM

(71) Applicant: HUAWEI TECHNOLOGIES CO.,LTD., Shenzhen, Guangdong (CN)

(72) Inventors: Gang Lu, Beijing (CN); Jianfeng Zhan, Beijing (CN); Yunwei Gao, Beijing (CN); Chongkang Tan, Beijing (CN); Dongliang Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 15/175,742

(22) Filed: Jun. 7, 2016

(65) Prior Publication Data

US 2016/0291984 A1  Oct. 6, 2016

Related U.S. Application Data

(63) Continuation of application No. PCT/CN2014/094053, filed on Dec. 17, 2014.

(30) Foreign Application Priority Data

Dec. 17, 2013 (CN) .......................... 2013 1 0695461

(51) Int. Cl.
*G06F 9/4401* (2018.01)
*G06F 9/50* (2006.01)
(Continued)

(52) U.S. Cl.
CPC .......... *G06F 9/4406* (2013.01); *G06F 9/4403* (2013.01); *G06F 9/4405* (2013.01);
(Continued)

(58) Field of Classification Search
None
See application file for complete search history.

(56) References Cited

U.S. PATENT DOCUMENTS

| | | | |
|---|---|---|---|
| 7,797,512 B1 | 9/2010 | Cheng et al. | |
| 2002/0049897 A1 | 4/2002 | Sekiguchi et al. | |

(Continued)

FOREIGN PATENT DOCUMENTS

| | | |
|---|---|---|
| CN | 101169731 A | 4/2008 |
| CN | 101246431 A | 8/2008 |

(Continued)

OTHER PUBLICATIONS

David Wentzlaff et al. Fleets: Scalable Services in a Factored Operating System, Computer Science and Artificial Intelligence Laboratory Technical Report, MIT-CSAIL-TR-2011-012, Mar. 9, 2011. total 15 pages.

(Continued)

*Primary Examiner* — Eric C Wai
(74) *Attorney, Agent, or Firm* — Fish & Richardson P.C.

(57) ABSTRACT

A resource processing method, an operating system, and a device are provided. The method is applied to a multi-core operating system, where the multi-core operating system includes a management operating system and multiple load operating systems that run on a host machine and includes a physical resource pool. According to the method, after selecting, in processor cores allocated to a first load operating system, a startup processor core that starts up the first load operating system, the management operating system instructs the startup processor core to read a mapping relationship that is from a virtual memory address to a physical memory address and that is required for executing a startup mirror of the first load operating system. Then, the management operating system instructs the startup processor core to execute the startup mirror pre-constructed for the (Continued)

first load operating system to start up the first load operating system.

30 Claims, 15 Drawing Sheets

(51) Int. Cl.
 G06F 9/455 (2018.01)
 G06F 13/24 (2006.01)
 G06F 9/46 (2006.01)
(52) U.S. Cl.
 CPC ........ *G06F 9/4408* (2013.01); *G06F 9/45533* (2013.01); *G06F 9/5083* (2013.01); *G06F 13/24* (2013.01)

(56) References Cited

U.S. PATENT DOCUMENTS

| | | |
|---|---|---|
| 2007/0271560 A1 | 11/2007 | Wahlert et al. |
| 2008/0005488 A1 | 1/2008 | Watkins et al. |
| 2008/0086729 A1 | 4/2008 | Kondoh et al. |
| 2010/0023941 A1 | 1/2010 | Iwamatsu et al. |
| 2012/0227040 A1 | 9/2012 | Gounares |
| 2013/0318334 A1 | 11/2013 | Waskiewicz, Jr. |

FOREIGN PATENT DOCUMENTS

| | | |
|---|---|---|
| CN | 101561769 A | 10/2009 |
| CN | 102053869 A | 5/2011 |
| CN | 102929719 A | 2/2013 |
| JP | 2002132741 | 5/2002 |
| JP | 2007200346 A | 8/2007 |
| JP | 2008097173 | 4/2008 |
| JP | 2010033206 | 2/2010 |
| JP | 2012145993 | 8/2012 |
| RU | 2433459 C2 | 11/2011 |
| WO | 2012060148 | 5/2012 |
| WO | 2013162523 A1 | 10/2013 |

OTHER PUBLICATIONS

Andrew Baumann et al. The Multikernel: A new OS architecture for scalable multicore systems, SOSP '09, Oct. 11-14, 2009. total 20 pages.
Juan A. colmenares et al:"tessellaion: refactoring the os around explicit resource containers with continuous adaptation", Jun. 1, 2013,XP55342935,10 pages.
Andrew baumann et al:"the multikernel: a new os architecture for scalable multicore systems", Oct. 1, 2009, XP55342924,16 pages.
Zwane Mwaikambo etal:"linux kernel hotplug cpu support", Jan. 1, 2004,XP55342897,16 pages.
Banga g et al:"resource containers:a new facility for resource management in server systems", Jan. 1, 1999, XP1544709,16 pages.

RESOURCE PROCESSING METHOD AND DEVICE FOR A MULTI-CORE OPERATING SYSTEM

CROSS-REFERENCE TO RELATED APPLICATIONS

This application is a continuation of International Application No. PCT/CN2014/094053, filed on Dec. 17, 2014, which claims priority to Chinese Patent Application No. 201310695461.0, filed on Dec. 17, 2013, both of which are hereby incorporated by reference in their entireties.

TECHNICAL FIELD

Embodiments of the present disclosure relate to communications technologies, and in particular, to a resource processing method, an operating system, and a device.

BACKGROUND

Currently, processors have entered an age of multi-core processors, and most multi-core processors support a virtualization technology. In a multi-core processor, multiple processor cores are integrated into one chip, thereby making parallel execution possible. Moreover, one physical computer can be converted to multiple virtual computers by using the virtualization technology. Therefore, with a multi-core processor and the virtualization technology combined, multiple operating systems can run on one physical computer simultaneously.

In an existing heterogeneous multi-core operating system architecture, one management operating system and multiple load operating systems run on one physical computer (host machine). The management operating system is configured to provide an execution environment for various application programs and the multiple load operating systems. The load operating systems are configured to provide an execution environment for various application programs. The management operating system provides physical resources corresponding to the execution environment for the load operating systems by using a hypervisor, where the physical resources mainly include a processor core, a physical memory, an external device, and the like. Each load operating system uses one or more processor cores in an exclusive manner, and shares a physical memory, an external device, and the like with another load operating system in a time division multiplexing manner.

Because multiple load operating systems share a physical memory, an external device, and the like in a time division multiplexing manner, when there are a relatively large quantity of load operating systems, a delay is caused for running of the load operating systems, thereby reducing overall performance of the load operating systems.

SUMMARY

Embodiments of the present disclosure provide a resource processing method, an operating system, and a device, so as to improve overall performance of a load operating system.

According to a first aspect, an embodiment of the present disclosure provides a resource processing method, where the method is applied to a multi-core operating system, the multi-core operating system includes a management operating system and multiple load operating systems that run on a host machine and includes a physical resource pool, the physical resource pool includes processor cores and a physical memory that are of the host machine, and the method includes:

allocating, by the management operating system to each load operating system, a physical resource set exclusively used by each load operating system, constructing a startup mirror for each load operating system, and setting, for each load operating system, a mapping relationship that is from a virtual memory address to a physical memory address and that is required for executing the startup mirror, where each physical resource set includes some of the processor cores of the host machine and a part of the physical memory of the host machine;

determining, by the management operating system and in processor cores allocated to a first load operating system, a startup processor core that starts up the first load operating system, where the first load operating system is any one of the load operating systems;

instructing, by the management operating system, the startup processor core to read a mapping relationship that is from a virtual memory address to a physical memory address and that is required for executing a startup mirror of the first load operating system and is pre-constructed by the management operating system, so as to enable the startup processor core to access, in a process of executing the startup mirror and according to the mapping relationship, the physical memory address; and instructing the startup processor core to execute the startup mirror pre-constructed for the first load operating system, where the startup mirror includes a startup parameter of the first load operating system, the startup parameter includes identifiers of the processor cores allocated to the first load operating system and an identifier of the physical memory address allocated to the first load operating system.

With reference to the first aspect, in a first possible implementation manner of the first aspect, the instructing, by the management operating system, the startup processor core to read a mapping relationship that is from a virtual memory address to a physical memory address and that is required for executing a startup mirror of the first load operating system and is pre-constructed by the management operating system, and the instructing the startup processor core to execute the startup mirror pre-constructed for the first load operating system include:

sending, by the management operating system, an inter-core interrupt message to the startup processor core, where the inter-core interrupt message instructs the startup processor core to execute an initialization program that is configured to initialize the startup processor core and that is corresponding to the first load operating system; and instructing, by the management operating system by instructing the startup processor core to execute the initialization program corresponding to the first load operating system, the startup processor core to read, from the initialization program, the mapping relationship that is from the virtual memory address to the physical memory address and that is required for executing the startup mirror of the first load operating system; and instructing the startup processor core to jump, after running of the initialization program ends, to the location that is of the startup mirror and is in the physical memory, so as to execute the startup mirror of the first load operating system.

With reference to the first possible implementation manner of the first aspect, in a second possible implementation manner of the first aspect, before the setting, by the management operating system for each load operating system, a mapping relationship that is from a virtual memory address to a physical memory address and that is required for executing the startup mirror, the method further includes:

presetting, by the management operating system for the first load operating system, an initialization program that is configured to initialize the first load operating system, and presetting, in the initialization program, the location that is of the startup mirror of the first load operating system and that is in the physical memory address; and the setting, by the management operating system for each load operating system, a mapping relationship that is from a virtual memory address to a physical memory address and that is required for executing the startup mirror includes:

setting, by the management operating system for the first load operating system and in the initialization program, the mapping relationship that is from the virtual memory address to the physical memory address and that is required for executing the startup mirror.

With reference to the first aspect, in a third possible implementation manner of the first aspect, before the determining, by the management operating system and in processor cores allocated to a first load operating system, a startup processor core that starts up the first load operating system, the method further includes:

acquiring, by the management operating system, available processor cores of a second load operating system, where the second load operating system is a logged-out load operating system, other than the first load operating system, in the multiple load operating systems, the available processor cores include a processor core that has been started up, and a physical resource set of the first load operating system includes the available processor cores; and the determining, by the management operating system and in processor cores allocated to a first load operating system, a startup processor core that starts up the first load operating system includes:

when the physical resource set of the first load operating system includes the available processor cores, determining, by the management operating system and in the available processor cores, the startup processor core that starts up the first load operating system.

With reference to the third possible implementation manner of the first aspect, in a fourth possible implementation manner of the first aspect, after the determining, by the management operating system and in the available processor cores, the startup processor core that starts up the first load operating system, the method further includes:

presetting, by the management operating system for the first load operating system, a daemon on the startup processor core, and presetting, in the daemon, a location that is of the startup mirror of the first load operating system and that is in the physical memory address; and the setting, by the management operating system for each load operating system, a mapping relationship that is from a virtual memory address to a physical memory address and that is required for executing the startup mirror includes:

setting, by the management operating system for the first load operating system and in the daemon, the mapping relationship that is from the virtual memory address to the physical memory address and that is required for executing the startup mirror.

With reference to the fourth possible implementation manner of the first aspect, in a fifth possible implementation manner of the first aspect, the instructing, by the management operating system, the startup processor core to read a mapping relationship that is from a virtual memory address to a physical memory address and that is required for executing a startup mirror of the first load operating system and is pre-constructed by the management operating system, and the instructing the startup processor core to execute the startup mirror pre-constructed for the first load operating system include:

sending, by the management operating system, an inter-core interrupt message to the daemon running on the startup processor core, where the inter-core interrupt message instructs the startup processor core to read, from the daemon, the mapping relationship that is from the virtual memory address to the physical memory address and that is required for executing the startup mirror and is pre-constructed by the management operating system for the first load operating system; and the location that is of the startup mirror corresponding to the first load operating system, that is in the physical memory address, and that is preset in the daemon by the management operating system instructs the startup processor core to jump to the location that is in the physical memory address and in which the startup mirror is located, so as to execute the startup mirror of the first load operating system.

With reference to the first aspect, or any possible implementation manner of the first to the fifth possible implementation manners of the first aspect, in a sixth possible implementation manner of the first aspect, the allocating, by the management operating system to each load operating system, a physical resource set exclusively used by each load operating system includes:

performing, by the management operating system according to a quantity of the load operating systems, first-time division on available physical resources that are in the physical resource pool and that are corresponding to identifiers of physical resources in a list of the available physical resources in the resource pool, to obtain multiple physical resource sets, where a quantity of the physical resource sets equals the quantity of the load operating systems, and determining, by the management operating system, a correspondence between each load operating system and each physical resource set; and allocating, by the management operating system to each load operating system according to the correspondence, the physical resource set exclusively used by each load operating system.

With reference to the sixth possible implementation manner of the first aspect, in a seventh possible implementation manner of the first aspect, each physical resource set further includes some external devices of the host machine; and the startup parameter further includes an identifier of an external device allocated to the first load operating system and a device description information table corresponding to the external device.

With reference to the seventh possible implementation manner of the first aspect, in an eighth possible implementation manner of the first aspect, after the instructing, by the management operating system, the startup processor core to execute the startup mirror pre-constructed for the first load operating system, the method further includes:

monitoring, by the management operating system, running of the first load operating system;

when utilization of a physical resource allocated to the first load operating system is less than a first preset threshold, determining that a physical resource needs to be reduced for the first load operating system, and determining a type identifier of the physical resource that needs to be reduced, where the type identifier of the physical resource is used to distinguish whether the physical resource is a processor core resource, a physical memory resource, or an external device resource; and performing, by the management operating system according to the type identifier of the physical resource that needs to be reduced, second-time division on the available physical resources that are in the physical resource pool and that are corresponding to the identifiers of the physical resources in the list of the available physical resources in the resource pool, and reducing the physical resource of the first load operating system, where the reduced physical resource is a physical resource corresponding to the type identifier of the physical resource that needs to be reduced.

With reference to the seventh possible implementation manner of the first aspect, in a ninth possible implementation manner of the first aspect, after the instructing, by the management operating system, the startup processor core to execute the startup mirror pre-constructed for the first load operating system, the method further includes:

monitoring, by the management operating system, running of the first load operating system;

when utilization of a physical resource allocated to the first load operating system is greater than a second preset threshold, determining that a physical resource needs to be added for the first load operating system, and determining a type identifier of the physical resource that needs to be added, where the type identifier of the physical resource is used to distinguish whether the physical resource that needs to be added is a processor core resource, a physical memory resource, or an external device resource; and performing, by the management operating system according to the type identifier of the physical resource that needs to be added, second-time division on the available physical resources that are in the physical resource pool and that are corresponding to the identifiers of the physical resources in the list of the available physical resources in the resource pool, and adding the physical resource of the first load operating system, where the added physical resource is a physical resource corresponding to the type identifier of the physical resource that needs to be added.

According to a second aspect, an embodiment of the present disclosure provides a resource processing method, where the method is applied to a multi-core operating system, the multi-core operating system includes a management operating system and multiple load operating systems that run on a host machine and includes a physical resource pool, the physical resource pool includes processor cores and a physical memory that are of the host machine, each load operating system exclusively uses a physical resource set allocated by the management operating system, and each physical resource set includes some of the processor cores of the host machine and a part of the physical memory of the host machine; the management operating system pre-constructs a startup mirror for each load operating system, and sets, for each load operating system, a mapping relationship that is from a virtual memory address to a physical memory address and that is required for executing the startup mirror; and the method includes:

reading, by a startup processor core of a first load operating system, a mapping relationship that is from a virtual memory address to a physical memory address and that is required for executing a startup mirror of the first load operating system, where the mapping relationship is used to enable the startup processor core of the first load operating system to access the physical memory address, and the first load operating system is any load operating system in the multi-core operating system;

jumping, by the startup processor core of the first load operating system according to an instruction that is set by the management operating system and that is for executing a startup mirror jump, to a location that is of the startup mirror corresponding to the first load operating system and that is in the physical memory address, and executing, according to the mapping relationship, the startup mirror corresponding to the first load operating system;

acquiring, by the startup processor core of the first load operating system and in a process of executing the startup mirror of the first load operating system, a startup parameter of the first load operating system from the startup mirror of the first load operating system, where the startup parameter includes identifiers of processor cores allocated to the first load operating system and an identifier of the physical memory address allocated to the first load operating system; and determining, by the first load operating system according to the identifiers of the processor cores and the identifier of the physical memory address of the first load operating system, a physical resource set that is allocated by the management operating system to the first load operating system and that is exclusively used by the first load operating system.

With reference to the second aspect, in a first possible implementation manner of the second aspect, the reading, by a startup processor core of a first load operating system, a mapping relationship that is from a virtual memory address to a physical memory address and that is required for executing a startup mirror of the first load operating system includes:

receiving, by the startup processor core of the first load operating system, an inter-core interrupt message sent by the management operating system, where the startup processor core executes, according to an instruction of the inter-core interrupt message, an initialization program that is configured to initialize the startup processor core and that is corresponding to the first load operating system; and executing, by the startup processor core of the first load operating system, the initialization program, and reading, from the initialization program, the mapping relationship that is from the virtual memory address to the physical memory address and that is required for executing the startup mirror and is pre-constructed by the management operating system for the first load operating system; and the jumping, by the startup processor core of the first load operating system according to an instruction that is set by the management operating system and that is for executing a startup mirror jump, to a location that is of the startup mirror corresponding to the first load operating system and that is in the physical memory address includes:

executing, by the startup processor core of the first load operating system, the initialization program, reading, from the initialization program, a jump instruction that is preset in the initialization program by the management operating system, and jumping to the location that is of the startup mirror corresponding to the first load operating system and that is in the physical memory address.

With reference to the second aspect, in a second possible implementation manner of the second aspect, the startup processor core of the first load operating system is a processor core that has been started up and that is determined by the management operating system, a daemon runs on the startup processor core of the first load operating system, the daemon is preset by the management operating system for the first load operating system, the location that is of the startup mirror corresponding to the first load operating system and that is in the physical memory address and the mapping relationship that is from the virtual memory address to the physical memory address and that is required for executing the startup mirror are set in the daemon;

the reading, by a startup processor core of a first load operating system, a mapping relationship that is from a virtual memory address to a physical memory address and that is required for executing a startup mirror of the first load operating system includes:

receiving, by the daemon running on the startup processor core of the first load operating system, an inter-core interrupt message sent by the management operating system, and reading, by the startup processor core according to an instruction of the inter-core interrupt message and from the daemon, the mapping relationship that is from the virtual memory address to the physical memory address and that is required for executing the startup mirror and is pre-constructed by the management operating system for the first load operating system; and the jumping, by the startup processor core of the first load operating system according to an instruction that is set by the management operating system and that is for executing a startup mirror jump, to a location that is of the startup mirror corresponding to the first load operating system and that is in the physical memory address includes:

reading, by the startup processor core of the first load operating system, a jump instruction that is preset in the daemon by the management operating system, and jumping to the location that is of the startup mirror corresponding to the first load operating system and that is in the physical memory address.

With reference to the second aspect, or the first or the second possible implementation manner of the second aspect, in a third possible implementation manner of the second aspect, each physical resource set further includes some external devices of the host machine; and the startup parameter further includes an identifier of an external device allocated by the management operating system to the first load operating system and a device description information table corresponding to the external device.

According to a third aspect, an embodiment of the present disclosure provides a management operating system, where the management operating system is applied to a multi-core operating system, the multi-core operating system includes the management operating system and multiple load operating systems that run on a host machine and includes a physical resource pool, the physical resource pool includes processor cores and a physical memory that are of the host machine, and the management operating system includes:

a resource allocating module, configured to allocate, to each load operating system, a physical resource set exclusively used by each load operating system, where each physical resource set includes some of the processor cores of the host machine and a part of the physical memory of the host machine;

a mapping relationship setting module, configured to: construct a startup mirror for each load operating system, and set, for each load operating system, a mapping relationship that is from a virtual memory address to a physical memory address and that is required for executing the startup mirror;

a startup processor core determining module, configured to determine, in processor cores allocated to a first load operating system, a startup processor core that starts up the first load operating system, where the first load operating system is any one of the load operating systems;

an instructing module, configured to instruct the startup processor core to read a mapping relationship that is from a virtual memory address to a physical memory address and that is required for executing a startup mirror of the first load operating system and is pre-constructed by the mapping relationship setting module, so as to enable the startup processor core to access, in a process of executing the startup mirror and according to the mapping relationship, the physical memory address; and instruct the startup processor core to execute the startup mirror pre-constructed for the first load operating system, where the startup mirror includes a startup parameter of the first load operating system, the startup parameter includes identifiers of the processor cores allocated to the first load operating system and an identifier of the physical memory address allocated to the first load operating system.

With reference to the third aspect, in a first possible implementation manner of the third aspect, the instructing module is specifically configured to:

send an inter-core interrupt message to the startup processor core, where the inter-core interrupt message instructs the startup processor core to execute an initialization program that is configured to initialize the startup processor core and that is corresponding to the first load operating system; and instruct, by instructing the startup processor core to execute the initialization program corresponding to the first load operating system, the startup processor core to read, from the initialization program, the mapping relationship that is from the virtual memory address to the physical memory address and that is required for executing the startup mirror of the first load operating system; and instruct the startup processor core to jump, after running of the initialization program ends, to the location that is of the startup mirror and is in the physical memory, so as to execute the startup mirror of the first load operating system.

With reference to the first possible implementation manner of the third aspect, in a second possible implementation manner of the third aspect, the management operating system further includes:

an initialization program configuring module, configured to: before the mapping relationship setting module sets, for each load operating system, the mapping relationship that is from the virtual memory address to the physical memory address and that is required for executing the startup mirror, preset, for the first load operating system, an initialization program that is configured to initialize the first load operating system, and preset, in the initialization program, the location that is of the startup mirror of the first load operating system and that is in the physical memory address; and the mapping relationship setting module is specifically configured to set, in the initialization program and for the first load operating system, the mapping relationship that is from the virtual memory address to the physical memory address and that is required for executing the startup mirror.

With reference to the third aspect, in a third possible implementation manner of the third aspect, the management operating system further includes:

an available-processor-core acquiring module, configured to acquire available processor cores of a second load operating system before the startup processor core determining module determines, in the processor cores allocated to the first load operating system, the startup processor core that starts up the first load operating system, where the second load operating system is a logged-out load operating system, other than the first load operating system, in the multiple load operating systems, the available processor cores include a processor core that has been started up, and a physical resource set of the first load operating system includes the available processor cores; and the startup processor core determining module is specifically configured to: when the physical resource set of the first load operating system includes the available processor cores, determine, in the available processor cores, the startup processor core that starts up the first load operating system.

With reference to the third possible implementation manner of the third aspect, in a fourth possible implementation manner of the third aspect, the management operating system further includes:

a daemon configuring module, configured to preset, for the first load operating system, a daemon on the startup processor core after the startup processor core determining module determines, in the available processor cores, the startup processor core that starts up the first load operating system, and preset, in the daemon, a location that is of the startup mirror of the first load operating system and that is in the physical memory address; and the mapping relationship setting module is specifically configured to set, for the first load operating system and in the daemon, the mapping relationship that is from the virtual memory address to the physical memory address and that is required for executing the startup mirror.

With reference to the fourth possible implementation manner of the third aspect, in a fifth possible implementation manner of the third aspect, the instructing module is specifically configured to: send an inter-core interrupt message to the daemon running on the startup processor core, where the inter-core interrupt message instructs the startup processor core to read, from the daemon, the mapping relationship that is from the virtual memory address to the physical memory address and that is required for executing the startup mirror and is pre-constructed by the management operating system for the first load operating system; and the location that is of the startup mirror corresponding to the first load operating system, that is in the physical memory address, and that is preset in the daemon by the daemon configuring module instructs the startup processor core to jump to the location that is in the physical memory address and in which the startup mirror is located, so as to execute the startup mirror of the first load operating system.

With reference to the third aspect, or any possible implementation manner of the first to the fifth possible implementation manners of the third aspect, in a sixth possible implementation manner of the third aspect, the resource allocating module is specifically configured to:

perform, according to a quantity of the load operating systems, first-time division on available physical resources that are in the physical resource pool and that are corresponding to identifiers of physical resources in a list of the available physical resources in the resource pool, to obtain multiple physical resource sets, where a quantity of the physical resource sets equals the quantity of the load operating systems, and the management operating system determines a correspondence between each load operating system and each physical resource set; and allocate, to each load operating system according to the correspondence, the physical resource set exclusively used by each load operating system.

With reference to the sixth possible implementation manner of the third aspect, in a seventh possible implementation manner of the third aspect, each physical resource set further includes some external devices of the host machine; and the startup parameter further includes an identifier of an external device allocated to the first load operating system and a device description information table corresponding to the external device.

With reference to the seventh possible implementation manner of the third aspect, in an eighth possible implementation manner of the third aspect, the management operating system further includes:

a first monitoring module, configured to monitor, after the instructing module instructs the startup processor core to execute the startup mirror pre-constructed for the first load operating system, running of the first load operating system; and a first resource managing module, configured to determine that a physical resource needs to be reduced for the first load operating system if a monitoring result of the first monitoring module is that utilization of a physical resource allocated to the first load operating system is less than a first preset threshold, and determine a type identifier of the physical resource that needs to be reduced, where the type identifier of the physical resource is used to distinguish whether the physical resource is a processor core resource, a physical memory resource, or an external device resource; and the resource allocating module is further configured to perform, according to the type identifier of the physical resource that needs to be reduced, second-time division on the available physical resources that are in the physical resource pool and that are corresponding to the identifiers of the physical resources in the list of the available physical resources in the resource pool, and reduce the physical resource of the first load operating system, where the reduced physical resource is a physical resource corresponding to the type identifier of the physical resource that needs to be reduced.

With reference to the seventh possible implementation manner of the third aspect, in a ninth possible implementation manner of the third aspect, the management operating system further includes:

a second monitoring module, configured to monitor, after the instructing module instructs the startup processor core to execute the startup mirror pre-constructed for the first load operating system, running of the first load operating system; and a second resource managing module, configured to determine that a physical resource needs to be added for the first load operating system if a monitoring result of the second monitoring module is that utilization of a physical resource allocated to the first load operating system is greater than a second preset threshold, and determine a type identifier of the physical resource that needs to be added, where the type identifier of the physical resource is used to distinguish whether the physical resource that needs to be added is a processor core resource, a physical memory resource, or an external device resource; and the resource allocating module is further configured to perform, according to the type identifier of the physical resource that needs to be added, second-time division on the available physical resources that are in the physical resource pool and that are corresponding to the identifiers of the physical resources in the list of the available physical resources in the resource pool, and add the physical resource of the first load operating system, where the added physical resource is a physical resource corresponding to the type identifier of the physical resource that needs to be added.

With reference to the seventh possible implementation manner of the third aspect, in a tenth possible implementation manner of the third aspect, the management operating system further includes:

a first receiving module, configured to receive, after the instructing module instructs the startup processor core to execute the startup mirror pre-constructed for the first load operating system, a resource reducing request message sent by the first load operating system, where the resource reducing request message includes a type identifier of a physical resource that needs to be reduced, and the type identifier of the physical resource is used to distinguish whether the physical resource is a processor core resource, a physical memory resource, or an external device resource; and the resource allocating module is further configured to perform, according to the type identifier, of the physical resource that needs to be reduced, in the resource reducing request message, second-time division on the available physical resources that are in the physical resource pool and that are corresponding to the identifiers of the physical resources in the list of the available physical resources in the resource pool, and reduce the physical resource of the first load operating system, where the reduced physical resource is a physical resource corresponding to the type identifier of the physical resource that needs to be reduced.

According to a fourth aspect, an embodiment of the present disclosure provides a load operating system, where the load operating system is applied to a multi-core operating system, the multi-core operating system includes a management operating system and multiple load operating systems that run on a host machine and includes a physical resource pool, the physical resource pool includes processor cores and a physical memory that are of the host machine, each load operating system exclusively uses a physical resource set allocated by the management operating system, and each physical resource set includes some of the processor cores of the host machine and a part of the physical memory of the host machine; the management operating system pre-constructs a startup mirror for each load operating system, and sets, for each load operating system, a mapping relationship that is from a virtual memory address to a physical memory address and that is required for executing the startup mirror; and the load operating system includes:

a mapping relationship acquiring module, configured to read a mapping relationship that is from a virtual memory address to a physical memory address and that is required for executing a startup mirror of a first load operating system, where the mapping relationship is used to enable a startup processor core of the first load operating system to access the physical memory address, and the first load operating system is any load operating system in the multi-core operating system;

an instruction executing module, configured to jump, according to an instruction that is set by the management operating system and that is for executing a startup mirror jump, to a location that is of the startup mirror corresponding to the first load operating system and that is in the physical memory address, and execute, according to the mapping relationship, the startup mirror corresponding to the first load operating system;

a startup parameter acquiring module, configured to acquire, in a process of executing the startup mirror of the first load operating system by the instruction executing module, a startup parameter of the first load operating system from the startup mirror of the first load operating system, where the startup parameter includes identifiers of processor cores allocated to the first load operating system and an identifier of the physical memory address allocated to the first load operating system; and a physical resource set acquiring module, configured to determine, according to the identifiers of the processor cores and the identifier of the physical memory address of the first load operating system, a physical resource set that is allocated by the management operating system to the first load operating system and that is exclusively used by the first load operating system.

With reference to the fourth aspect, in a first possible implementation manner of the fourth aspect, the mapping relationship acquiring module is specifically configured to:

receive an inter-core interrupt message sent by the management operating system, where the startup processor core executes, according to an instruction of the inter-core interrupt message, an initialization program that is configured to initialize the startup processor core and that is corresponding to the first load operating system; and execute the initialization program, and read, from the initialization program, the mapping relationship that is from the virtual memory address to the physical memory address and that is required for executing the startup mirror and is pre-constructed by the management operating system for the first load operating system; and the instruction executing module is specifically configured to: execute the initialization program, read, from the initialization program, a jump instruction that is preset in the initialization program by the management operating system, and jump to the location that is of the startup mirror corresponding to the first load operating system and that is in the physical memory address.

With reference to the fourth aspect, in a second possible implementation manner of the fourth aspect, the startup processor core of the first load operating system is a processor core that has been started up and that is determined by the management operating system, a daemon runs on the startup processor core of the first load operating system, the daemon is preset by the management operating system for the first load operating system, the location that is of the startup mirror corresponding to the first load operating system and that is in the physical memory address and the mapping relationship that is from the virtual memory address to the physical memory address and that is required for executing the startup mirror are set in the daemon;

the mapping relationship acquiring module is specifically configured to read, from the daemon and according to an instruction of an inter-core interrupt message after the daemon running on the startup processor core receives the inter-core interrupt message sent by the management operating system, the mapping relationship that is from the virtual memory address to the physical memory address and that is required for executing the startup mirror and is pre-constructed by the management operating system for the first load operating system; and the instruction executing module is specifically configured to: read a jump instruction that is preset in the daemon by the management operating system, and jump to the location that is of the startup mirror corresponding to the first load operating system and that is in the physical memory address.

With reference to the fourth aspect, or the first or the second possible implementation manner of the fourth aspect, in a third possible implementation manner of the fourth aspect, each physical resource set further includes some external devices of the host machine; and the startup parameter further includes an identifier of an external device allocated by the management operating system to the first load operating system and a device description information table corresponding to the external device.

According to a fifth aspect, an embodiment of the present disclosure provides a multi-core operating system, including:

the management operating system running on a host machine described in the third aspect;

the multiple load operating systems described in the fourth aspect; and a physical resource pool, where the physical resource pool includes processor cores, a physical memory, and an external device that are of the host machine.

According to a sixth aspect, an embodiment of the present disclosure provides a host machine, including a processor and a memory, where the memory stores an execution instruction, and when the host machine runs, the processor communicates with the memory, and the processor executes the execution instruction, so as to enable the host machine to execute the resource processing method described in the first aspect, or any possible implementation manner of the first to the ninth possible implementation manners of the first aspect.

The embodiments of the present disclosure provide a resource processing method, an operating system and a device. According to the method, a management operating system allocates, to each load operating system, a physical resource set exclusively used by each load operating system, constructs a startup mirror for each load operating system, and sets, for each load operating system, a mapping relationship that is from a virtual memory address to a physical memory address and that is required for executing the startup mirror; the management operating system determines, in processor cores allocated to a first load operating system, a startup processor core that starts up the first load operating system; the management operating system instructs the startup processor core to read a mapping relationship that is from a virtual memory address to a physical memory address and that is required for executing a startup mirror of the first load operating system, so as to enable the startup processor core to access the physical memory address according to the mapping relationship, instructs the startup processor core to execute the startup mirror pre-constructed for the first load operating system, where the startup mirror includes a startup parameter of the first load operating system, and the startup parameter includes identifiers of the processor cores allocated to the first load operating system and an identifier of the physical memory address allocated to the first load operating system; the management operating system writes the startup parameter into the startup mirror, so as to allocate, to a load operating system, a physical resource exclusively used by the load operating system, without requiring involvement of a hypervisor, thereby simplifying a process of allocating the physical resource by the management operating system to the load operating system. Further, each load operating system can exclusively use a physical resource, so as to construct an independent page table, running clock, runtime environment, and the like on the physical resource exclusively used by each load operating system, thereby improving overall performance of the load operating systems.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
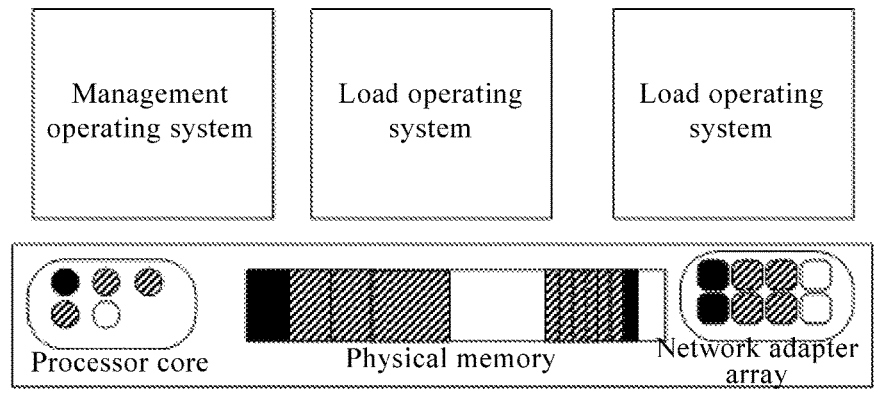
FIG. 1 is a schematic diagram of an architecture of a multi-core operating system according to the present disclosure.

FIG. 1 is a schematic diagram of an architecture of a multi-core operating system according to the present disclosure. As shown in FIG. 1, the multi-core operating system provided in this embodiment includes a management operating system and multiple load operating systems that run on a host machine and includes a physical resource pool. The host machine is an actual physical node, and the management operating system manages the multiple load operating systems, which mainly includes allocating, to the multiple load operating systems, physical resources exclusively used by the multiple load operating systems, and being responsible for startup and logout of the load operating systems. The multiple load operating systems include a load operating system that has not been started up and a load operating system that is running. In particular, after a load operating system is started up, the load operating system may exclusively use a physical resource allocated by the management operating system, and access the physical resource; the load operating system constructs an independent page table, an independent clock, an independent runtime library, and the like on the physical resource exclusively used by the load operating system, without requesting help from a hypervisor; the load operating system uses the independent page table, the independent clock, the independent runtime library, and the like, so that the management operating system and the load operating system share system buses, including an address bus, a data bus, and a control bus. Communication between the management operating system and a load operating system and communication between a load operating system and another load operating system are implemented by an internal communication mechanism (an inter-instance communication module). The management operating system and each load operating system have an independent page table separately, each load operating system uses an independent physical resource, and the management operating system performs management but is not involved in access, communication, or the like that is performed by a load operating system on a physical resource. The physical resource pool includes processor cores and a physical memory that are of the host machine; optionally, the physical resource pool further includes an external device such as a network adapter array.

Figure 2:
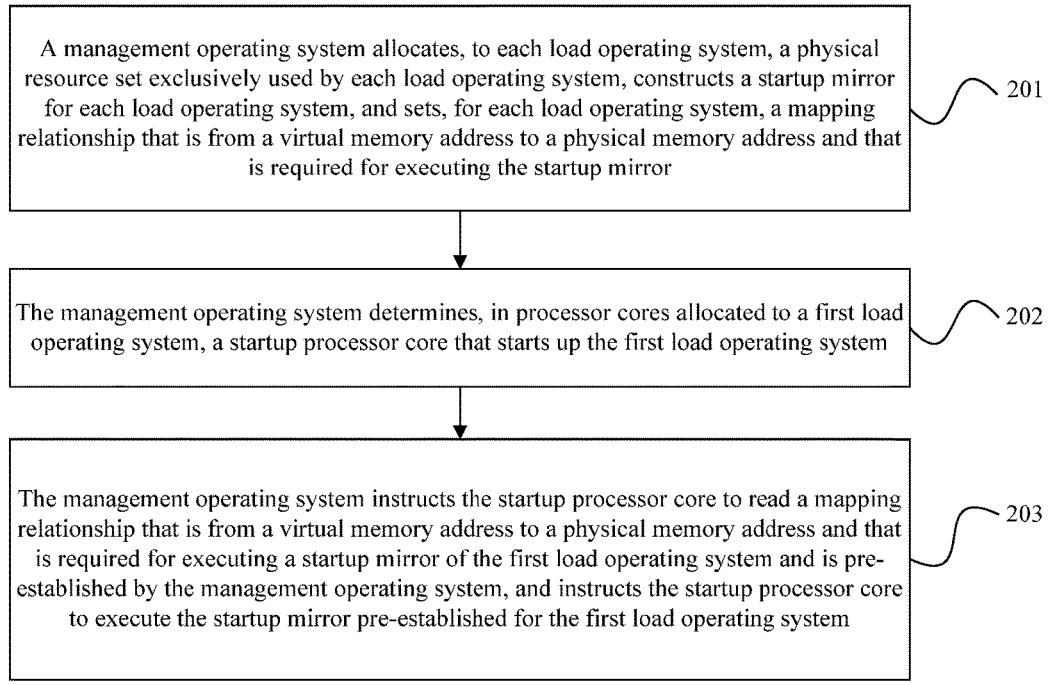
FIG. 2 is a schematic flowchart of Embodiment 1 of a resource processing method according to the present disclosure.

FIG. 2 is a schematic flowchart of Embodiment 1 of a resource processing method according to the present disclosure. An execution body of this embodiment is a management operating system that runs on a host machine, where the management operating system may be specifically the management operating system shown in the embodiment in FIG. 1. As shown in FIG. 2, the resource processing method provided in this embodiment includes:

Step 201: The management operating system allocates, to each load operating system, a physical resource set exclusively used by each load operating system, constructs a startup mirror for each load operating system, and sets, for each load operating system, a mapping relationship that is from a virtual memory address to a physical memory address and that is required for executing the startup mirror.

Each physical resource set includes some of the processor cores of the host machine and a part of the physical memory of the host machine.

Step 202: The management operating system determines, in processor cores allocated to a first load operating system, a startup processor core that starts up the first load operating system.

The first load operating system is any one of the load operating systems.

Step 203: The management operating system instructs the startup processor core to read a mapping relationship that is from a virtual memory address to a physical memory address and that is required for executing a startup mirror of the first load operating system and is pre-constructed by the management operating system, and instructs the startup processor core to execute the startup mirror pre-constructed for the first load operating system.

The startup mirror includes a startup parameter of the first load operating system, and the startup parameter includes identifiers of the processor cores allocated to the first load operating system and an identifier of the physical memory address allocated to the first load operating system.

An application scenario of this embodiment may be that shown in the embodiment in FIG. 1, and no detail is repeatedly described herein in this embodiment. In this embodiment, the resource processing method provided in this embodiment is described in detail by using a management operating system as an execution body. The management operating system may be specifically the management operating system shown in FIG. 1.

In a specific implementation process, in step 201, that the management operating system allocates, to each load operating system, a physical resource set exclusively used by each load operating system may be implemented in the following manner:

The management operating system determines available physical resources that are in the physical resource pool and that are corresponding to identifiers of physical resources in a list of the available physical resources in the resource pool. Specifically, the management operating system maintains the list of the available physical resources in the resource pool, where identifiers of all available physical resources in the physical resource pool are recorded in the list. The available physical resources are physical resources that are not currently used by the management operating system or the load operating systems. The management operating system performs, according to a quantity of the load operating systems, first-time division on the available physical resources in the physical resource pool, to obtain multiple physical resource sets, where a quantity of the physical resource sets equals the quantity of the load operating systems; the management operating system determines a correspondence between each load operating system and each physical resource set, and allocates, to each load operating system and according to the correspondence, a physical resource set exclusively used by each load operating system. Each physical resource set includes some of the processor cores of the host machine and a part of the physical memory of the host machine.

Optionally, the management operating system may further allocate, to a load operating system, an external device exclusively used by the load operating system, and the physical resource set further includes an external device of the host machine. The external device may be a network adapter or a magnetic disk, or the like.

A specific embodiment is used as an example. Still refer to FIG. 1. In FIG. 1, a black area in the physical resource pool is a physical resource that is being used, and a physical resource, other than the black area, is an available physical resource. There are two load operating systems, which are referred to as a first load operating system and a second load operating system. The management operating system performs the first-time division on the available physical resources, and obtains two physical resource sets. In a specific implementation process, the management operating system performs physical division on the physical resources, and the division may be performed in the following manner:

Processor core: A processor core is used as a minimum functional unit for the division, or a processor may be used as a unit. For a heterogeneous platform, a heterogeneous processor core and a coprocessor core may also be classified as global computing resources.

Physical memory: A continuous or discontinuous segment of a physical memory is used as a unit for the division, and a specific size of a memory block may be a size of a signal block or a size of a hybrid block.

With respect to an external device, the division may mainly be performed in the following manner:

Network: A physical network adapter is used as a unit for the division. When a physical network adapter is not sufficient, a physical network adapter having a multi-array function or supporting server virtualization (for example, Single-Root I/O Virtualization, SR-IOV for short) is used, and is divided according to an array or a virtual function (VF). Only when neither a physical network adapter nor an independent physical function of the network adapter is sufficient, it may be considered to share a physical network adapter and provide multiple virtual network adapters for an operating system instance, in a manner of virtualizing front and back ends of the network adapter.

Magnetic disk: A physical magnetic disk is used as a unit for the division. When a physical magnetic disk is not sufficient, a magnetic disk that may support an SR-IOV technology in the future may be divided by using a disk virtualization function. A single physical magnetic disk is shared in a manner of logically partitioning the magnetic disk, and finally technologies such a network file system (NFS) and a random access memory disk (RAM) may be used to replace a function of a conventional disk file system.

Terminal: Because using of a terminal device (for example, a monitor or a keyboard), a serial port, or the like consumes no resource, in a premise that system performance is not affected, multiple sets of device resources such as serial ports and terminals may be obtained by virtualization in a hardware abstraction layer virtualization manner, to meet an upper-layer need.

With respect to the resource division, in this embodiment, it is ensured that the processor cores and the physical memory are divided in physical space, and a physical unit division manner is also used on a peripheral, but an alternative solution in which time division multiplexing is performed when physical division is inadequate is also supported.

The management operating system constructs, according to types of an operating system instance running on the first load operating system and an operating system instance running on the second load operating system, correspondences between the physical resource sets and the load operating systems. When the management operating system needs, according to the type of the operating system instance running on the first load operating system, more physical resources, the management operating system allocates, to the first load operating system, a physical resource corresponding to a shadow area; correspondingly, the management operating system allocates, to the second load operating system, a physical resource corresponding to a white area.

After the management operating system allocates, to each load operating system, a physical resource exclusively used by each load operating system, the management operating system pre-constructs, for each load operating system, a startup mirror used to start up each load operating system. The startup mirror refers to a program that configures hardware required for core running and constructs a data structure required for the core running, for a load operating system when the hardware and the core data structure that are required for running of the load operating system have not been configured or have not been sufficiently prepared. The startup mirror is specifically implemented in a manner of a program so that a startup processor core can update a status of the startup processor core, where the program that is configured for the load operating system after the hardware and the core data structure have been prepared and that starts up each core service and loads each core module, so as to finally start up the load operating system.

Further, the management operating system further sets, for each load operating system, the mapping relationship that is from the virtual memory address to the physical memory address and that is required for executing a respective startup mirror of each load operating system. Persons skilled in the art can understand that, the mapping relationship that is from the virtual memory address to the physical memory address and that is required for executing the startup mirror and involved in this embodiment specifically refer to a mapping relationship that is from the virtual memory address in virtual memory addresses corresponding to the startup mirror to the physical memory address, and the management operating system may implement the mapping relationship in a manner of a page table.

In a specific implementation process, a startup processor core of a load operating system first acquires a mapping relationship that is from a virtual memory address to a physical memory address and that is required for executing a startup mirror and are set by the management operating system for the load operating system, and the load operating system may directly access the physical memory address according to the mapping relationship and does not need to perform address translation. After the startup mirror of the load operating system has been started up, the startup mirror is configured to start up the load operating system. In a running process, the startup mirror directly accesses the physical memory address according to the mapping relationship that is from the virtual memory address to the physical memory address and that is corresponding to the startup mirror. Persons skilled in the art can understand that, the management operating system may set, for the startup mirror, some mapping relationships that are from virtual memory addresses to physical memory addresses, or may set, for the startup mirror, all mapping relationships that are from virtual memory addresses to physical memory addresses. When the management operating system sets, for the startup mirror, some mapping relationships that are from the virtual memory addresses to the physical memory addresses, and when the startup processor core that has been allocated to the load operating system is in a process of executing startup of the startup mirror, the startup processor core may set all the mapping relationships that are from the virtual memory addresses to the physical memory addresses and that are required for executing the startup mirror. After the load operating system has been started up, the load operating system sets all mapping relationships that are from virtual memory addresses to physical memory addresses and that are required for executing the load operating system.

In step 202, that the management operating system determines, in processor cores allocated to a first load operating system, a startup processor core includes the following possible implementation manners: the management operating system determines the startup processor core according to a preset policy; the management operating system randomly chooses, in the processor cores allocated to the first load operating system, one processor core as the startup processor core; the management operating system acquires a user instruction, and determines the startup processor core according to the user instruction. This embodiment imposes no special limitation on a specific implementation process of determining the startup processor core by the management operating system.

In step 203, the management operating system instructs the startup processor core to read the mapping relationship that is from the virtual memory address to the physical memory address and that is required for executing the startup mirror of the first load operating system.

Specifically, the startup processor core may directly access the physical memory address by reading the mapping relationship and does not need to perform an address translation process.

Further, in step 203, the management operating system further instructs the startup processor core to execute the startup mirror pre-constructed by the management operating system for the first load operating system. Because the startup mirror includes the startup parameter of the first load operating system, the startup processor core reads, in the process of executing the startup mirror, the startup parameter from the startup mirror, where the startup parameter includes the identifiers of the processor cores allocated to the first load operating system and the identifier of the physical memory address allocated to the first load operating system, so that the first load operating system acquires, according to the startup parameter, a physical resource set allocated by the management operating system to the first load operating system. Running of the startup mirror is for starting up the load operating system. The running of the startup mirror equals a startup process of the first load operating system.

Optionally, when the physical resource set includes some external devices of the host machine, the startup parameter further includes an identifier of an external device allocated to the first load operating system and a device description information table corresponding to the external device. The device description information table includes configuration information of the external device, for example, configuration of a physical memory address of the external address, and a mapping relationship from a virtual memory address to the physical memory address. This embodiment imposes no special limitation on specific content included in the device description information table.

According to the resource processing method provided in this embodiment, a management operating system allocates, to each load operating system, a physical resource set exclusively used by each load operating system, constructs a startup mirror for each load operating system, and sets, for each load operating system, a mapping relationship that is from a virtual memory address to a physical memory address and that is required for executing the startup mirror; the management operating system determines, in processor cores allocated to a first load operating system, a startup processor core that starts up the first load operating system; the management operating system instructs the startup processor core to read a mapping relationship that is from a virtual memory address to a physical memory address and that is required for executing a startup mirror of the first load operating system, so as to enable the startup processor core to access the physical memory address according to the mapping relationship, instructs the startup processor core to execute the startup mirror pre-constructed for the first load operating system, where the startup mirror includes a startup parameter of the first load operating system, and the startup parameter includes identifiers of the processor cores allocated to the first load operating system and an identifier of the physical memory address allocated to the first load operating system; the management operating system writes the startup parameter into the startup mirror, so as to allocate, to a load operating system, a physical resource exclusively used by the load operating system, without requiring involvement of a hypervisor, thereby simplifying a process of allocating the physical resource by the management operating system to the load operating system. Further, each load operating system can exclusively use a physical resource, so as to construct an independent page table, clock, runtime environment, and the like on the physical resource exclusively used by each load operating system, thereby improving overall performance of the load operating systems.

The following uses several specific embodiments to describe in detail the technical solutions of the method embodiment shown in FIG. 2.

Figure 3:
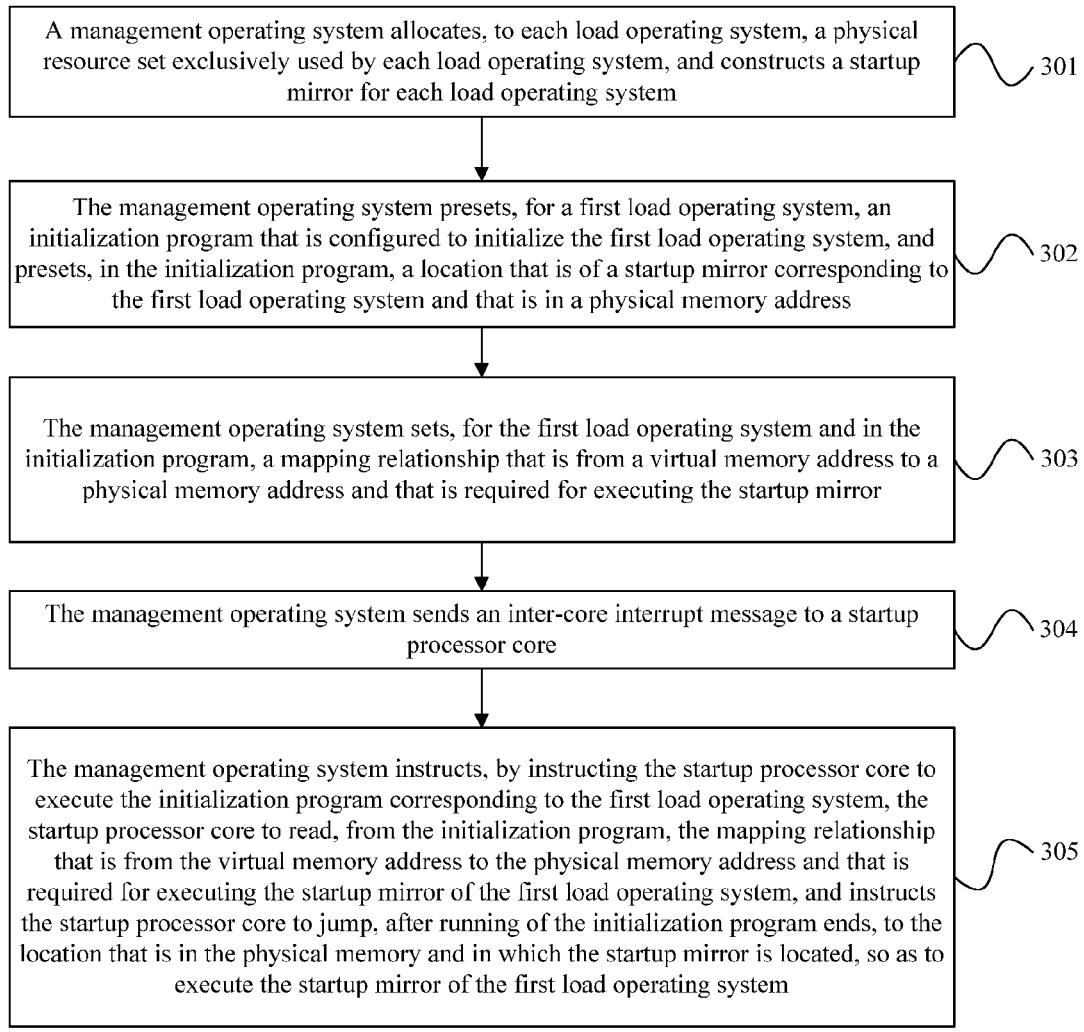
FIG. 3 is a schematic flowchart of Embodiment 2 of a resource processing method according to the present disclosure.

A specific embodiment may be that shown in FIG. 3. FIG. 3 is a schematic flowchart of Embodiment 2 of a resource processing method according to the present disclosure. As shown in FIG. 3, the resource processing method provided in this embodiment of the present disclosure includes:

Step 301: The management operating system allocates, to each load operating system, a physical resource set exclusively used by each load operating system, and constructs a startup mirror for each load operating system.

Each physical resource set includes some of the processor cores of the host machine and a part of the physical memory of the host machine.

Step 302: The management operating system presets, for the first load operating system, an initialization program that is configured to initialize the first load operating system, and presets, in the initialization program, a location that is of the startup mirror corresponding to the first load operating system and that is in the physical memory address.

Step 303: The management operating system sets, for the first load operating system and in the initialization program, the mapping relationship that is from the virtual memory address to the physical memory address and that is required for executing the startup mirror.

Step 304: The management operating system sends an inter-core interrupt message to the startup processor core.

The inter-core interrupt message instructs the startup processor core to execute the initialization program that is configured to initialize the startup processor core and that is corresponding to the first load operating system.

Step 305: The management operating system instructs, by instructing the startup processor core to execute the initialization program corresponding to the first load operating system, the startup processor core to read, from the initialization program, the mapping relationship that is from the virtual memory address to the physical memory address and that is required for executing the startup mirror of the first load operating system, and instructs the startup processor core to jump, after running of the initialization program ends, to the location that is of the startup mirror and is in the physical memory, so as to execute the startup mirror of the first load operating system.

The startup mirror includes the startup parameter of the first load operating system, and the startup parameter includes the identifiers of the processor cores allocated to the first load operating system and the identifier of the physical memory address allocated to the first load operating system.

In step 301, a process in which the management operating system allocates, to each load operating system, the physical resource set exclusively used by each load operating system and constructs the startup mirror for each load operating system is similar to that in step 201, and no detail is repeatedly described herein in this embodiment.

In step 302, the management operating system presets, for the first load operating system, the initialization program that is configured to initialize the first load operating system, and presets, in the initialization program, the location that is of the startup mirror corresponding to the first load operating system and that is in the physical memory address.

Persons skilled in the art can understand that, the management operating system presets, for each load operating system, an initialization program corresponding to each load operating system, and presets, in the initialization program, a location that is of the startup mirror corresponding to each load operating system and that is in the physical memory address. Persons skilled in the art can understand that, a location that is of a startup mirror corresponding to each load operating system and that is in the virtual memory address may also be preset in the initialization program, and the startup processor core may acquire, according to the mapping relationship that is from the virtual memory address to the physical memory address, the location that is in the physical memory address and in which the startup mirror is located.

In step 303, the management operating system sets, for the first load operating system and in the initialization program, the mapping relationship that is from the virtual memory address to the physical memory address and that is required for executing the startup mirror.

In step 304, the management operating system sends the inter-core interrupt message to the startup processor core, where the inter-core interrupt message instructs the startup processor core to execute the initialization program that is configured to initialize the startup processor core and that is corresponding to the first load operating system.

Persons skilled in the art can understand that, a value is transferred by the inter-core interrupt message and may be referred to as an interrupt vector, and both the value corresponding to the inter-core interrupt message and an execution process corresponding to the value are agreed on by the management operating system and the first load operating system in advance. When the management operating system sends the inter-core interrupt message to the startup processor core, the inter-core interrupt message instructs the startup processor core to execute the initialization program that is configured to initialize the startup processor core and that is corresponding to the first load operating system.

After receiving the inter-core interrupt message, the startup processor core of the first load operating system searches for the initialization program in a preset fixed physical memory, runs the initialization program, and completes initialization of the startup processor core, where the initialization of the startup processor core is a startup process of the startup processor core. In a running process of the initialization program, the startup processor core reads, from the running initialization program, the location that is of the startup mirror corresponding to the first load operating system, that is in the physical memory address, and that is preset by the management operating system for the first load operating system, so as to start up the startup mirror.

In step 305, the management operating system instructs the startup processor core to execute the initialization program corresponding to the first load operating system; in a process of executing the initialization program, the startup processor core reads the mapping relationship that is from the virtual memory address to the physical memory address and that is required for executing the startup mirror of the first load operating system.

That the management operating system instructs the startup processor core to jump, after running of the initialization program ends, to a location that is in the physical memory and in which the startup mirror is located, so as to execute the startup mirror of the first load operating system is implemented in the following manner:

A last instruction of the initialization program is used to instruct the startup processor core to jump to the startup mirror. When running the last instruction of the initialization program, the startup processor core jumps to the startup mirror to execute the startup mirror, where the startup mirror includes the startup parameter of the first load operating system, and the startup parameter includes the identifiers of the processor cores allocated to the first load operating system and the identifier of the physical memory address allocated to the first load operating system.

The first load operating system determines, according to the identifiers of the processor cores allocated to the first load operating system and the identifier of the physical memory address allocated to the first load operating system, the physical resource set that is allocated by the management operating system to the first load operating system and that is exclusively used by the first load operating system.

According to the resource processing method provided in this embodiment, a management operating system pre-constructs an initialization program for a load operating system, presets, in the initialization program and for the load operating system, a location that is of a startup mirror corresponding to a first load operating system and that is in a physical memory address, and presets, in the initialization program and for the first load operating system, a mapping relationship that is from a virtual memory address to a physical memory address and that is required for executing the startup mirror; a startup processor core of the load operating system executes the initialization program, reads a startup parameter from the startup mirror, acquires a physical resource set according to the startup parameter, and completes a startup process of the load operating system. The management operating system allocates, to a load operating system, a physical resource exclusively used by the load operating system, without requiring involvement of a hypervisor, thereby simplifying a process of allocating the physical resource by the management operating system to the load operating system; further, each load operating system can exclusively use a physical resource, thereby improving overall performance of the load operating systems.

Figure 4:
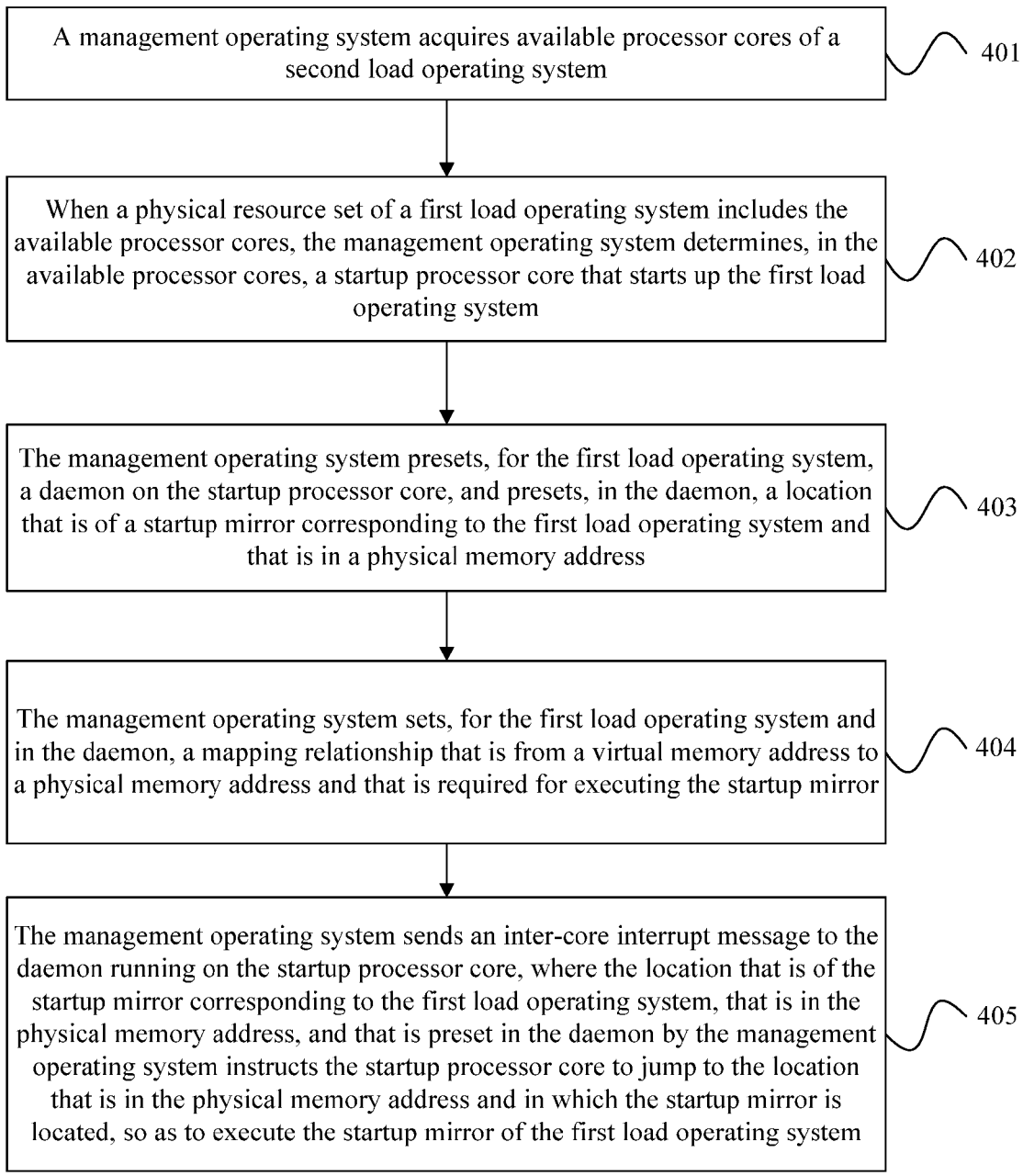
FIG. 4 is a schematic flowchart of Embodiment 3 of a resource processing method according to the present disclosure.

Another specific embodiment may be that shown in FIG. 4. FIG. 4 is a schematic flowchart of Embodiment 3 of a resource processing method according to the present disclosure. As shown in FIG. 4, the resource processing method provided in this embodiment of the present disclosure includes:

Step 401: The management operating system acquires available processor cores of a second load operating system.

The second load operating system is a logged-out load operating system, other than the first load operating system, in the multiple load operating systems, the available processor cores include a processor core that has been started up, and a physical resource set of the first load operating system includes the available processor cores.

Step 402: When a physical resource set of the first load operating system includes the available processor cores, the management operating system determines, in the available processor cores, the startup processor core that starts up the first load operating system.

Step 403: The management operating system presets, for the first load operating system, a daemon on the startup processor core, and presets, in the daemon, a location that is of the startup mirror corresponding to the first load operating system and that is in the physical memory address.

Step 404: The management operating system sets, for the first load operating system and in the daemon, the mapping relationship that is from the virtual memory address to the physical memory address and that is required for executing the startup mirror.

Step 405: The management operating system sends an inter-core interrupt message to the daemon running on the startup processor core, where the location that is of the startup mirror corresponding to the first load operating system, that is in the physical memory address, and that is preset in the daemon by the management operating system instructs the startup processor core to jump to the location that is in the physical memory address and in which the startup mirror is located, so as to execute the startup mirror of the first load operating system.

The inter-core interrupt message instructs the startup processor core to read, from the daemon, the mapping relationship that is from the virtual memory address to the physical memory address and that is required for executing the startup mirror and is pre-constructed by the management operating system for the first load operating system.

In step 401, that the management operating system acquires available processor cores of a second load operating system may include the following possible implementation manners: the management operating system forcibly makes the second load operating system log out in a running process of the second load operating system; the management operating system makes the second load operating system log out after running of the second load operating system ends; the second load operating system automatically logs out after running ends. After the second load operating system logs out, the management operating system acquires the available processor cores of the second load operating system, where the available processor cores include a startup processor core of the second load operating system and another processor core that runs another application program.

Persons skilled in the art can understand that, the physical resource set of the first load operating system may include the available processor cores, or may not include the available processor cores.

In particular, in this embodiment, the second load operating system is made to log out, but the startup processor core of the second load operating system has run the initialization program; the management operating system may use the startup processor core of the second load operating system as the startup processor core of the first load operating system. When the startup processor core of the second load operating system acts as the startup processor core of the first load operating system, it is not required to run the initialization program again to complete an initialization process; however, when an processor core, which is in the available processor cores and runs another application program, acts as the startup processor core, it is still required to run the initialization program to complete initialization.

In step 402, when the physical resource set of the first load operating system includes the available processor cores, the management operating system determines, in the available processor cores, the startup processor core that starts up the first load operating system.

Persons skilled in the art can understand that, when the physical resource set of the first load operating system includes the available processor cores, the management operating system may determine, in the available processor cores, the startup processor core of the first load operating system, or may determine the startup processor core in other processor cores in the physical resource set.

When the management operating system determines the startup processor core in the available processor cores, the following manners may be used for implementation: the management operating system determines the startup processor core in the available processor cores according to a preset policy; the management operating system randomly selects, from the available processor cores, one processor core as the startup processor core; the management operating system acquires a user instruction, and determines the startup processor core in the available processor cores according to the user instruction.

In step 403, the management operating system sets, for the first load operating system, the daemon on the startup processor core; after the setting is complete, the daemon runs all the time on the startup processor core that has been started up, and waits for various system commands sent by the management operating system. The daemon is preset by the management operating system for the first load operating system. The management operating system further presets, in the daemon, the location that is of the startup mirror corresponding to the first load operating system and that is in the physical memory address.

Further, in step 404, the management operating system presets, in the daemon, the mapping relationship that is from the virtual memory address to the physical memory address and that is required for executing the startup mirror of the first load operating system.

In step 405, the management operating system sends the inter-core interrupt message to the daemon running on the startup processor core, and an instruction corresponding to the inter-core interrupt message is agreed on by the management operating system and the first load operating system in advance. After the daemon running on the startup processor core receives the inter-core interrupt message sent by the management operating system, the startup processor core reads, from the daemon, the mapping relationship that is from the virtual memory address to the physical memory address and that is required for executing the startup mirror and is pre-constructed by the management operating system for the first load operating system; in a process of executing the startup mirror by the startup processor core, the startup processor core accesses the physical memory address according to the mapping relationship.

The management operating system instructs the startup processor core to jump to the location that is in the physical memory address and in which the startup mirror is located, so as to execute the startup mirror of the first load operating system, where a jump command is set in the daemon, so that the startup processor core acquires, from the daemon, the location that is of the startup mirror corresponding to the first load operating system and that is in the physical memory address, and jumps to the location that is in the physical memory address and in which the startup mirror is located, so as to execute the startup mirror of the first load operating system.

According to the resource processing method provided in this embodiment, a management operating system sets a jump command in a daemon, so that a startup processor core acquires, from the daemon, a location that is of a startup mirror corresponding to a first load operating system and that is in a physical memory address, and jumps to the location that is in the physical memory address and in which the startup mirror is located, so as to execute the startup mirror of the first load operating system and acquire a startup parameter from the startup mirror. The management operating system allocates, to a load operating system, a physical resource exclusively used by the load operating system, without requiring involvement of a hypervisor, thereby simplifying a process of allocating the physical resource by the management operating system to load operating system; further, each load operating system can exclusively use a physical resource, thereby improving overall performance of the load operating systems.

Figure 5:
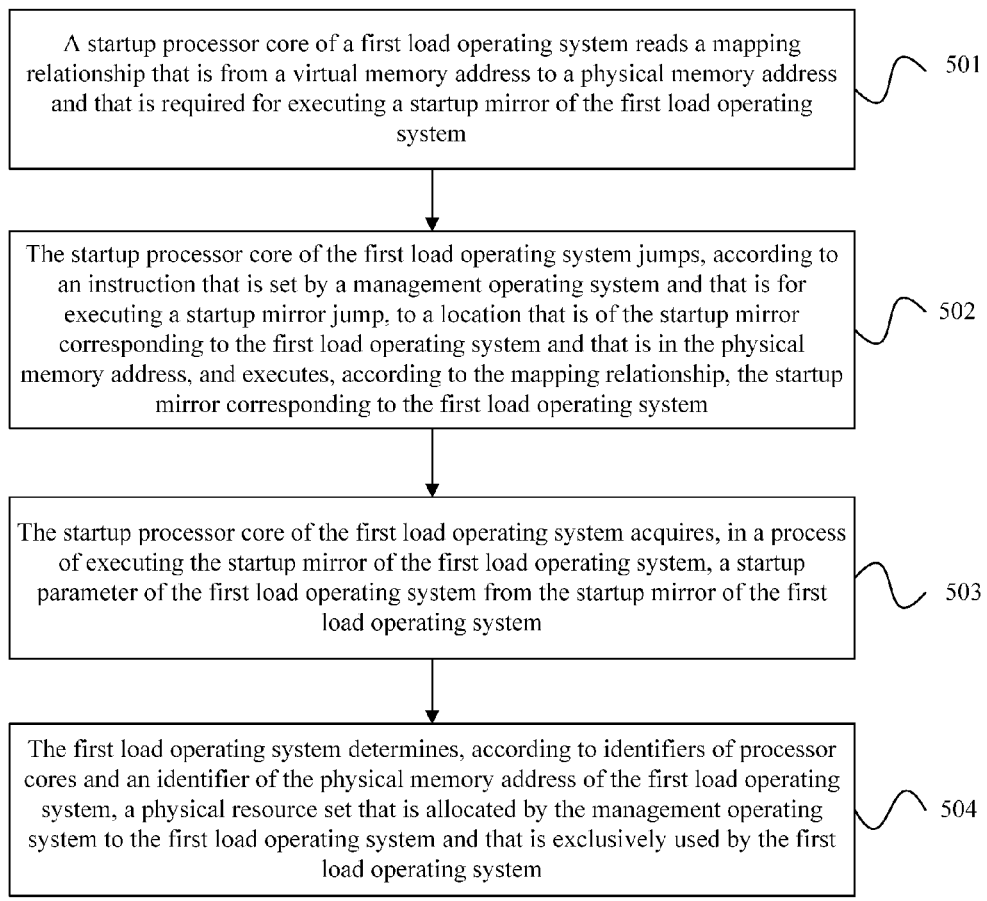
FIG. 5 is a schematic flowchart of Embodiment 4 of a resource processing method according to the present disclosure.

FIG. 5 is a schematic flowchart of Embodiment 4 of a resource processing method according to the present disclosure. The resource processing method in this embodiment is applied to a multi-core operating system, the multi-core operating system includes a management operating system and multiple load operating systems that run on a host machine and includes a physical resource pool, the physical resource pool includes processor cores and a physical memory that are of the host machine, each load operating system exclusively uses a physical resource set allocated by the management operating system, and each physical resource set includes some of the processor cores of the host machine and a part of the physical memory of the host machine; the management operating system pre-constructs a startup mirror for each load operating system, and sets, for each load operating system, a mapping relationship that is from a virtual memory address to a physical memory address and that is required for executing the startup mirror. An execution body of this embodiment is any load operating system in the multiple load operating systems. For ease of description, in this embodiment, the execution body is referred to as a first load operating system. As shown in FIG. 5, the resource processing method provided in this embodiment includes:

Step 501: A startup processor core of the first load operating system reads a mapping relationship that is from a virtual memory address to a physical memory address and that is required for executing a startup mirror of the first load operating system.

The mapping relationship is used to enable the startup processor core of the first load operating system to access the physical memory address, and the first load operating system is any load operating system in the multi-core operating system.

Step 502: The startup processor core of the first load operating system jumps, according to an instruction that is set by the management operating system and that is for executing a startup mirror jump, to a location that is of the startup mirror corresponding to the first load operating system and that is in the physical memory address, and executes, according to the mapping relationship, the startup mirror corresponding to the first load operating system.

Step 503: The startup processor core of the first load operating system acquires, in a process of executing the startup mirror of the first load operating system, a startup parameter of the first load operating system from the startup mirror of the first load operating system.

The startup parameter includes identifiers of processor cores allocated to the first load operating system and an identifier of the physical memory address allocated to the first load operating system.

Step 504: The first load operating system determines, according to identifiers of the processor cores and an identifier of the physical memory address of the first load operating system, a physical resource set that is allocated by the management operating system to the first load operating system and that is exclusively used by the first load operating system.

An application scenario of this embodiment may be that shown in the embodiment in FIG. 1, and no detail is repeatedly described herein in this embodiment. In this embodiment, the resource processing method provided in this embodiment is described in detail by using the first load operating system as the execution body. The first load operating system may be specifically any load operating system in the load operating systems shown in FIG. 1.

In step 501, after the management operating system determines the startup processor core for the first load operating system, the startup processor core of the first load operating system first acquires the mapping relationship that is from the virtual memory address to the physical memory address and that is required for executing the startup mirror and is set by the management operating system for the first load operating system, and the first load operating system may directly access the physical memory address according to the mapping relationship and does not need to perform address translation.

In step 502, the startup processor core of the first load operating system receives the instruction that is preset by the management operating system for the first load operating system and that is for executing the startup mirror jump, the first load operating system jumps, according to the instruction that is set by the management operating system and that is for executing the startup mirror jump, to the location that is of the startup mirror corresponding to the first load operating system and that is in the physical memory address; when the startup processor core of the first load operating system executes the startup mirror, the first load operating system directly accesses the physical memory address according to the mapping relationship that is from the virtual memory address to the physical memory address and that is corresponding to the startup mirror, so as to complete a startup process of the startup mirror.

In step 503, the startup processor core of the first load operating system acquires, in a process of executing the startup mirror of the first load operating system, the startup parameter of the first load operating system from the startup mirror of the first load operating system, where the startup parameter includes the identifiers of the processor cores allocated by the management operating system to the first load operating system and the identifier of the physical memory address allocated by the management operating system to the first load operating system.

Optionally, when the physical resource set includes some external devices of the host machine, the startup parameter further includes an identifier of an external device allocated by the management operating system to the first load operating system and a device description information table corresponding to the external device. The device description information table includes configuration information of the external device, for example, configuration of a physical memory address of the external address, and a mapping relationship from a virtual memory address to the physical memory address. This embodiment imposes no special limitation on specific content included in the device description information table.

In step 504, the first load operating system may determine, according to the identifiers of the processor cores and the identifier of the physical memory address of the first load operating system, the physical resource set that is allocated by the management operating system to the first load operating system and that is exclusively used by the first load operating system, and the first load operating system may construct an independent page table, clock, runtime environment, and the like on a physical resource that is exclusively used by the first load operating system.

Persons skilled in the art can understand that, an objective of executing the startup mirror by the first load operating system is to start up the first load operating system; after running of the startup mirror ends, startup of the first load operating system is complete, and the first load operating system enters a running stage.

According to the resource processing method provided in this embodiment of the present disclosure, a startup processor core of a first load operating system reads a mapping relationship that is from a virtual memory address to a physical memory address and that is required for executing a startup mirror of the first load operating system, jumps, according to an instruction that is set by a management operating system and that is for executing a startup mirror jump, to a location that is of the startup mirror corresponding to the first load operating system and that is in the physical memory address, executes, according to the mapping relationship, the startup mirror corresponding to the first load operating system, and acquires, in a process of executing the startup mirror of the first load operating system, a startup parameter of the first load operating system from the startup mirror of the first load operating system, where the startup parameter includes identifiers of processor cores allocated to the first load operating system and an identifier of the physical memory address allocated to the first load operating system. The first load operating system determines, according to the identifiers of the processor cores and the identifier of the physical memory address of the first load operating system, a physical resource set that is allocated by the management operating system to the first load operating system and that is exclusively used by the first load operating system. The first load operating system reads the startup parameter from the startup mirror, so as to acquire the physical resource set that is allocated by the management operating system to the first load operating system and that is exclusively used by the load operating system, without requiring involvement of a hypervisor, thereby simplifying a process of allocating a physical resource by the management operating system to the load operating system. Further, each load operating system can exclusively use a physical resource, so as to construct an independent page table, clock, runtime environment, and the like on the physical resource exclusively used by each load operating system, thereby improving overall performance of the load operating systems.

The following uses several specific embodiments to describe in detail the technical solutions of the method embodiment shown in FIG. 5.

Figure 6:
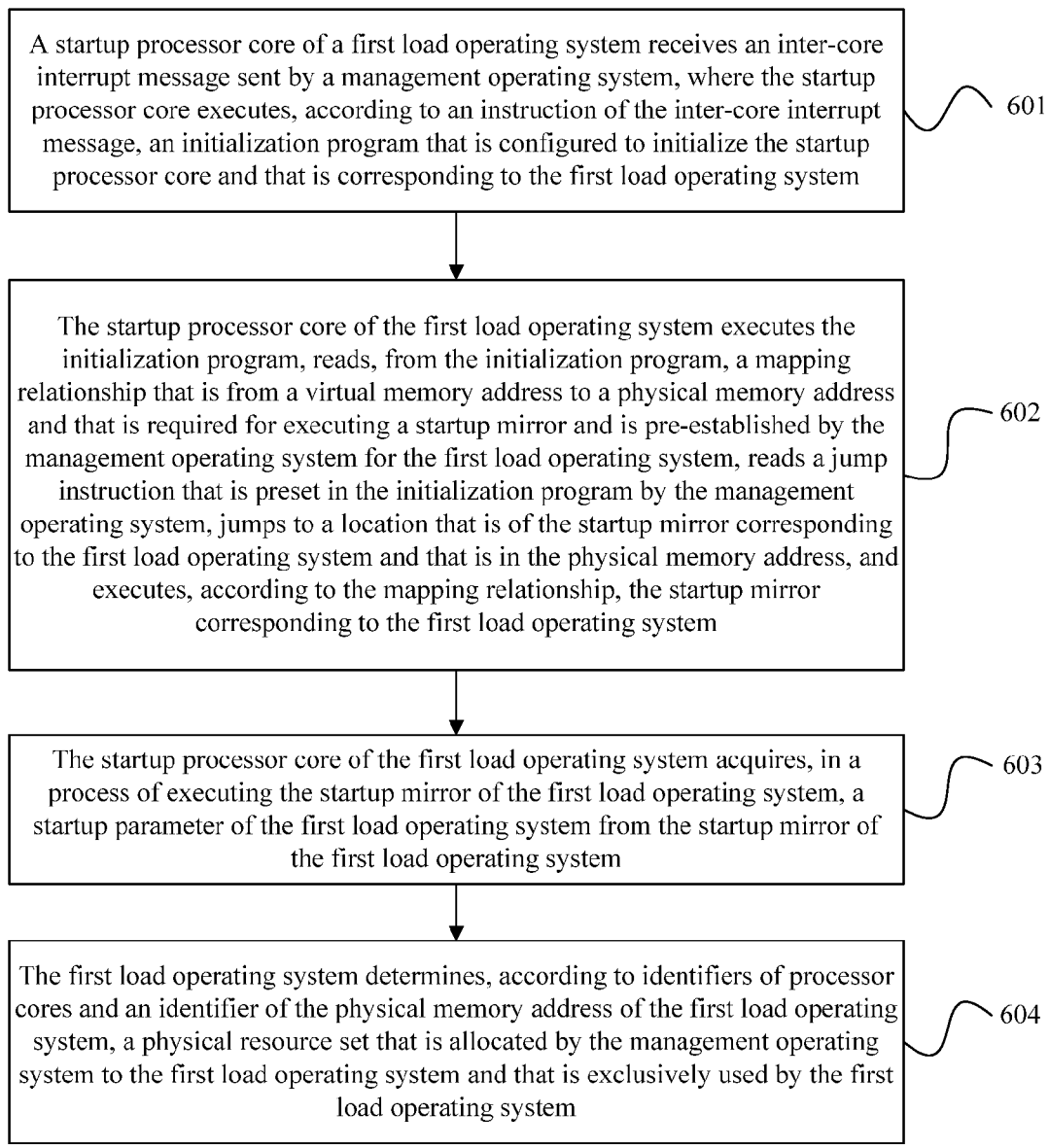
FIG. 6 is a schematic flowchart of Embodiment 5 of a resource processing method according to the present disclosure.

A specific embodiment may be that shown in FIG. 6. FIG. 6 is a schematic flowchart of Embodiment 5 of a resource processing method according to the present disclosure. As shown in FIG. 6, the resource processing method provided in this embodiment of the present disclosure includes:

Step 601: The startup processor core of the first load operating system receives an inter-core interrupt message sent by the management operating system, where the startup processor core executes, according to an instruction of the inter-core interrupt message, an initialization program that is configured to initialize the startup processor core and that is corresponding to the first load operating system.

Step 602: The startup processor core of the first load operating system executes the initialization program, reads, from the initialization program, the mapping relationship that is from the virtual memory address to the physical memory address and that is required for executing the startup mirror and is pre-constructed by the management operating system for the first load operating system, reads a jump instruction that is preset in the initialization program by the management operating system, jumps to the location that is of the startup mirror corresponding to the first load operating system and that is in the physical memory address, and executes, according to the mapping relationship, the startup mirror corresponding to the first load operating system.

Step 603: The startup processor core of the first load operating system acquires, in a process of executing the startup mirror of the first load operating system, the startup parameter of the first load operating system from the startup mirror of the first load operating system.

The startup parameter includes the identifiers of the processor cores allocated to the first load operating system and the identifier of the physical memory address allocated to the first load operating system.

Step 604: The first load operating system determines, according to the identifiers of the processor cores and the identifier of the physical memory address of the first load operating system, the physical resource set that is allocated by the management operating system to the first load operating system and that is exclusively used by the first load operating system.

In this embodiment, step 603 is similar to step 503 and step 604 is similar to step 504, and no detail is repeatedly described herein in this embodiment.

In step 601, the startup processor core of the first load operating system receives the inter-core interrupt message sent by the management operating system, where the startup processor core executes, according to the instruction of the inter-core interrupt message, the initialization program that is configured to initialize the startup processor core and that is corresponding to the first load operating system.

Specifically, a value is transferred by the inter-core interrupt message and may be referred to as an interrupt vector, and both the value corresponding to the inter-core interrupt message and an execution process corresponding to the value are agreed on by the management operating system and the first load operating system in advance. The management operating system sends the inter-core interrupt message to the startup processor core of the first load operating system, and the inter-core interrupt message instructs the startup processor core to execute the initialization program that is configured to initialize the startup processor core and that is corresponding to the first load operating system.

After receiving the inter-core interrupt message sent by the management operating system, the startup processor core of the first load operating system searches for the initialization program in a preset fixed physical memory, and runs the initialization program to complete initialization of the startup processor core, and the initialization of the startup processor core is a startup process of the startup processor core.

In step 602, the startup processor core of the first load operating system reads, in the process of executing the initialization program and from the initialization program, the mapping relationship that is from the virtual memory address to the physical memory address and that is required for executing the startup mirror and is pre-constructed by the management operating system for the first load operating system; after the startup processor core of the first load operating system reads the mapping relationship, in a subsequent process of executing the startup mirror, the startup processor core of the first load operating system may directly access the physical memory address according to the mapping relationship and does not need to perform address translation.

Further, a last instruction of the initialization program is used to instruct the startup processor core to jump to the startup mirror and may be construed as a jump instruction. The startup processor core of the first load operating system reads, from the initialization program, the jump instruction that is preset in the initialization program by the management operating system, jumps to the location that is of the startup mirror corresponding to the first load operating system and that is in the physical memory address, and directly accesses the physical memory address according to the mapping relationship, so as to execute the startup mirror corresponding to the first load operating system.

According to the resource processing method provided in this embodiment of the present disclosure, a first load operating system reads, from an initialization program, a mapping relationship that is from a virtual memory address to a physical memory address and that is required for executing a startup mirror and is pre-constructed by a management operating system for the first load operating system, reads a jump instruction that is preset in the initialization program by the management operating system, jumps to a location that is of the startup mirror corresponding to the first load operating system and that is in the physical memory address, executes, according to the mapping relationship, the startup mirror corresponding to the first load operating system, reads a startup parameter from the startup mirror, acquires a physical resource set according to the startup parameter, and completes a startup process of the first load operating system. The management operating system allocates, to a load operating system, a physical resource exclusively used by the load operating system, without requiring involvement of a hypervisor, thereby simplifying a process of allocating the physical resource by the management operating system to load operating system; further, each load operating system can exclusively use a physical resource, thereby improving overall performance of the load operating systems.

Figure 7:
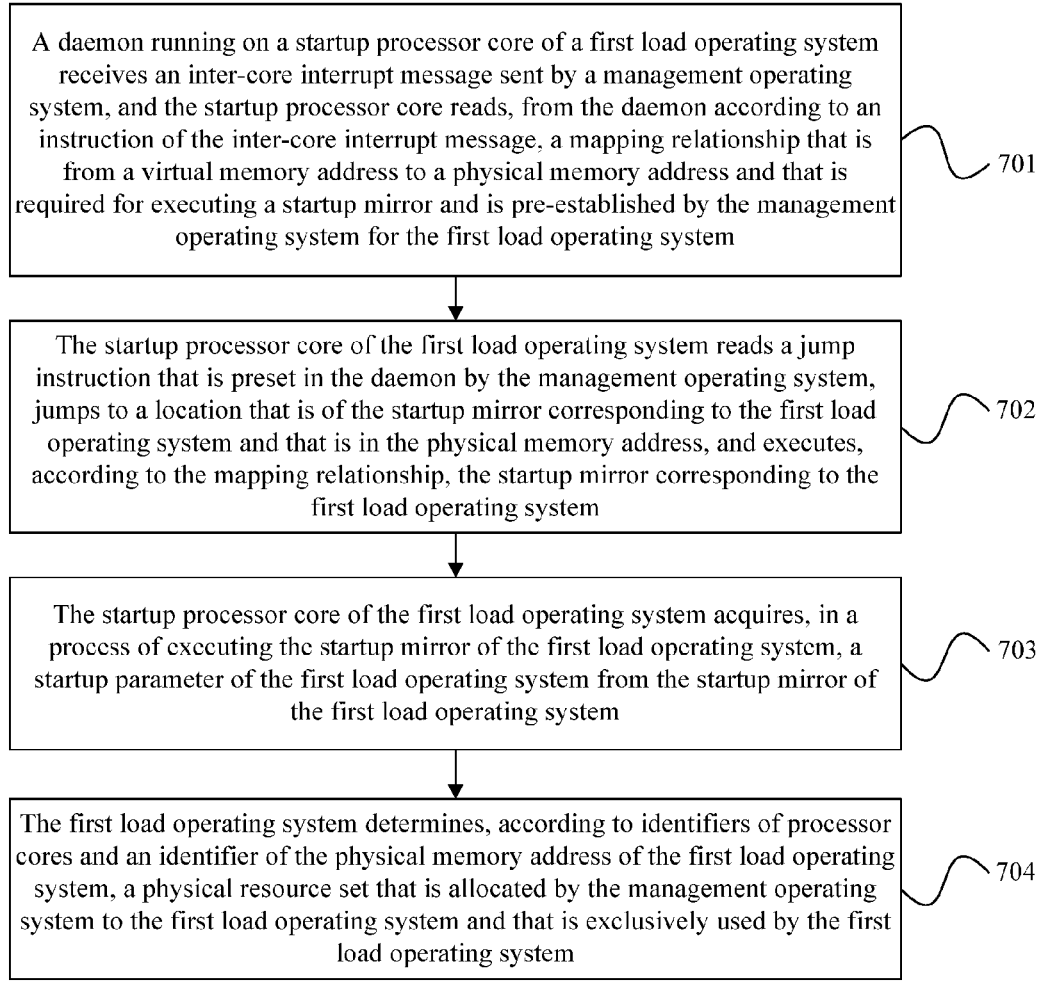
FIG. 7 is a schematic flowchart of Embodiment 6 of a resource processing method according to the present disclosure.

Another specific embodiment is as follows: In this embodiment, the startup processor core of the first load operating system is a processor core that has been started up and that is determined by the management operating system, a daemon runs on the startup processor core of the first load operating system, the daemon is preset by the management operating system for the first load operating system, the location that is of the startup mirror corresponding to the first load operating system and that is in the physical memory address and the mapping relationship that is from the virtual memory address to the physical memory address and that is required for executing the startup mirror are set in the daemon. FIG. 7 is a schematic flowchart of Embodiment 6 of a resource processing method according to the present disclosure. As shown in FIG. 7, the resource processing method provided in this embodiment of the present disclosure includes:

Step 701: The daemon running on the startup processor core of the first load operating system receives an inter-core interrupt message sent by the management operating system, and the startup processor core reads, from the daemon according to an instruction of the inter-core interrupt message, the mapping relationship that is from the virtual memory address to the physical memory address and that is required for executing the startup mirror and is pre-constructed by the management operating system for the first load operating system.

Step 702: The startup processor core of the first load operating system reads a jump instruction that is preset in the daemon by the management operating system, jumps to the location that is of the startup mirror corresponding to the first load operating system and that is in the physical memory address, and executes, according to the mapping relationship, the startup mirror corresponding to the first load operating system.

Step 703: The startup processor core of the first load operating system acquires, in a process of executing the startup mirror of the first load operating system, the startup parameter of the first load operating system from the startup mirror of the first load operating system.

The startup parameter includes the identifiers of the processor cores allocated to the first load operating system and the identifier of the physical memory address allocated to the first load operating system.

Step 704: The first load operating system determines, according to the identifiers of the processor cores and the identifier of the physical memory address of the first load operating system, the physical resource set that is allocated by the management operating system to the first load operating system and that is exclusively used by the first load operating system.

A difference between this embodiment and the embodiment in FIG. 6 lies in that the startup processor core in this embodiment is a processor core that has been started up, that is, an initialization process does not need to be performed on the startup processor core. Step 703 in this embodiment is similar to step 503 in the embodiment in FIG. 5 and step 704 is similar to step 504 in the embodiment in FIG. 5, and no detail is repeated described herein in this embodiment. In a specific implementation process, the management operating system presets, for the first load operating system, the daemon on the startup processor core; after the setting is complete, the daemon runs all the time on the startup processor core that has been started up.

In step 701, the management operating system sends the inter-core interrupt message to the daemon running on the startup processor core, and an instruction corresponding to the inter-core interrupt message is agreed on by the management operating system and the first load operating system in advance. After the daemon running on the startup processor core of the first load operating system receives the inter-core interrupt message sent by the management operating system, the startup processor core reads, from the daemon, the mapping relationship that is from the virtual memory address to the physical memory address and that is of the startup mirror and is pre-constructed by the management operating system for the first load operating system; in a process of executing the startup mirror by the startup processor core, the startup processor core accesses the physical memory address according to the mapping relationship.

In step 702, the startup processor core of the first load operating system reads the jump instruction that is preset in the daemon by the management operating system, jumps to the location that is of the startup mirror corresponding to the first load operating system and that is in the physical memory address, and executes, according to the mapping relationship, the startup mirror corresponding to the first load operating system.

According to the resource processing method provided in this embodiment, a startup processor core of a first load operating system acquires, from a preset daemon, a location that is of a startup mirror corresponding to the first load operating system and that is in a physical memory address, jumps to the location that is in the physical memory address and in which the startup mirror is located, so as to execute the startup mirror of the first load operating system and acquire a startup parameter from the startup mirror. A management operating system allocates, to a load operating system, a physical resource exclusively used by the load operating system, without requiring involvement of a hypervisor, thereby simplifying a process of allocating the physical resource by the management operating system to the load operating system; further, each load operating system can exclusively use a physical resource, thereby improving overall performance of the load operating systems.

Based on the embodiments in FIG. 5 to FIG. 7, the startup processor core executes the startup mirror and completes the startup of the first load operating system. After the first load operating system has been started up, the first load operating system constructs all mapping relationships that are from virtual memory addresses to physical memory addresses and that are required for executing the first load operating system; the processor core of the first load operating system converts, according to the mapping relationships, the virtual memory addresses to the physical memory addresses, and directly accesses the physical memory addresses.

Further, in a running process of the first load operating system, the first load operating system may execute, by using a processor core allocated to the first load operating system, a privileged instruction delivered by the management operating system. In a specific implementation process, the processor core that executes the privileged instruction may be the startup processor core, or may be another processor core other than the startup processor core, as long as the processor core that executes the privileged instruction is a processor core allocated by the management operating system to the first load operating system. The privileged instruction is applied to an operating system and generally is not directly provided for a user. The privileged instruction is mainly used for resource allocation and management, including detecting a user access right, creating and switching a task, and the like.

In this embodiment, the first load operating system directly executes the privileged instruction, without a step of translating or performing hypercall on a privileged operation in a virtualization technology. Specifically, the management operating system may deliver a privileged instruction, which does not affect a normal running status of the host machine, to the first load operating system for the first load operating system to perform execution.

The embodiments in FIG. 2 to FIG. 7 describe in detail the process of allocating a physical resource by the management operating system to the first load operating system, and further describe in detail how the first load operating system executes the startup mirror to complete the startup process of the first load operating system.

In the running process of the first load operating system, the physical resource of the first load operating system further needs to be dynamically adjusted. In a specific implementation process, there are two possible implementation manners for dynamically adjusting the first load operating system.

One possible implementation manner is that the management operating system monitors running of the first load operating system and adjusts the physical resource of the first load operating system, which specifically includes two possible situations.

In one possible situation: the management operating system monitors the running of the first load operating system; and when utilization of a physical resource allocated to the first load operating system is less than a first preset threshold, determines that a physical resource needs to be reduced for the first load operating system, and determines a type identifier of the physical resource that needs to be reduced, where the type identifier of the physical resource is used to distinguish whether the physical resource is a processor core resource, a physical memory resource, or an external device resource; and the management operating system performs, according to the type identifier of the physical resource that needs to be reduced, second-time division on the available physical resources that are in the physical resource pool and that are corresponding to the identifiers of the physical resources in the list of the available physical resources in the resource pool, and reduces the physical resource of the first load operating system, where the reduced physical resource is a physical resource corresponding to the type identifier of the physical resource that needs to be reduced.

In the other possible situation: the management operating system monitors the running of the first load operating system; and when utilization of a physical resource allocated to the first load operating system is greater than a second preset threshold, determines that a physical resource needs to be added for the first load operating system, and determines a type identifier of the physical resource that needs to be added, where the type identifier of the physical resource is used to distinguish whether the physical resource that needs to be added is a processor core resource, a physical memory resource, or an external device resource; and the management operating system performs, according to the type identifier of the physical resource that needs to be added, second-time division on the available physical resources that are in the physical resource pool and that are corresponding to the identifiers of the physical resources in the list of the available physical resources in the resource pool, and adds the physical resource of the first load operating system, where the added physical resource is a physical resource corresponding to the type identifier of the physical resource that needs to be added.

Specifically, in this embodiment, the physical resources allocated by the management operating system to the first load operating system include a processor core resource, a physical memory resource, and an external device resource. The management operating system monitors, in the running process of the first load operating system, utilization of the physical resources that have been allocated to the first load operating system, that is, monitors the utilization of the processor core resource, the physical memory resource, and the external device resource.

When the management operating system determines that utilization of a physical resource allocated to the first load operating system is less than the first preset threshold, it indicates that the management operating system allocates too many physical resources to the first load operating system when allocating, to the first load operating system, the physical resource set that is exclusively used by the first load operating system; in this case, the management operating system determines that a physical resource needs to be reduced for the first load operating system. Because there are three types of physical resources, the management operating system determines, according to utilization of each physical resource, a type identifier of the physical resource that needs to be reduced, and then the management operating system performs, according to the type identifier of the physical resource that needs to be reduced, the second-time division on the available physical resources that are in the physical resource pool and that are corresponding to the identifiers of the physical resources in the list of the available physical resources in the resource pool, and reduces the physical resource of the first load operating system. In a specific implementation process, the management operating system may perform, according to utilization of a physical resource of the first load operating system and utilization of a physical resource of another load operating system, the second-time division on the available physical resources, so as to reduce the physical resource of the first load operating system. The reduced physical resource is a physical resource corresponding to the type identifier of the physical resource that needs to be reduced.

When the management operating system determines that utilization of a physical resource allocated to the first load operating system is greater than the second preset threshold, it indicates that the management operating system allocates too few physical resources to the first load operating system when allocating, to the first load operating system, the physical resource set that is exclusively used by the first load operating system; in this case, the management operating system determines that a physical resource needs to be added for the first load operating system. Because there are three types of physical resources, the management operating system determines, according to utilization of each physical resource, a type identifier of the physical resource that needs to be added, and then the management operating system performs, according to the type identifier of the physical resource that needs to be added, the second-time division on the available physical resources in the physical resource pool, and adds the physical resource of the first load operating system. In a specific implementation process, the management operating system may perform, according to utilization of a physical resource of the first load operating system and utilization of a physical resource of another load operating system, the second-time division on the available physical resources, so as to add the physical resource of the first load operating system. The added physical resource is a physical resource corresponding to the type identifier of the physical resource that needs to be added.

The other possible implementation manner is that: the first load operating system monitors a use status of a physical resource of the first load operating system, so that the management operating system adjusts the physical resource of the first load operating system. Two possible situations may be specifically included:

In one possible situation: the first load operating system monitors a physical resource of the first load operating system; and if the first load operating system determines that utilization of a physical resource allocated by the management operating system to the first load operating system is less than a first preset threshold, the first load operating system sends a resource reducing request message to the management operating system, where the resource reducing request message includes a type identifier of a physical resource that needs to be reduced, and the type identifier of the physical resource is used to distinguish whether the physical resource that needs to be reduced is a processor core resource, a physical memory resource, or an external device resource.

In the other possible situation: the first load operating system monitors a physical resource of the first load operating system; and if the first load operating system determines that utilization of a physical resource allocated by the management operating system to the first load operating system is greater than a second preset threshold, the first load operating system sends a resource adding request message to the management operating system, where the resource adding request message includes a type identifier of a physical resource that needs to be added, and the type identifier of the physical resource is used to distinguish whether the physical resource that needs to be added is a processor core resource or a physical memory resource.

Specifically, in this embodiment, the first load operating system determines that the physical resources allocated by the management operating system to the first load operating system include a processor core resource, a physical memory resource, and an external device resource. The first load operating system monitors, in the running process, utilization of the physical resources that have been allocated by the management operating system to the first load operating system, that is, monitors the utilization of the processor core resource, the physical memory resource, and the external device resource.

When the first load operating system determines that utilization of a physical resource allocated to the first load operating system is less than the first preset threshold, it indicates that the management operating system allocates too many physical resources to the first load operating system when allocating, to the first load operating system, the physical resource set exclusively used by the first load operating system; in this case, the first load operating system determines that a physical resource needs to be reduced for the first load operating system, and sends a resource reducing request message to the management operating system. Because there are three types of physical resources, the first load operating system determines, according to utilization of each physical resource, a type identifier of the physical resource that needs to be reduced. Therefore, the resource reducing request message includes the type identifier of the physical resource that needs to be reduced, where the type identifier of the physical resource is used to distinguish whether the physical resource that needs to be reduced is a processor core resource, a physical memory resource, or an external device resource.

When the first load operating system determines that utilization of a physical resource allocated to the first load operating system is greater than the second preset threshold, it indicates that the management operating system allocates too few physical resources to the first load operating system when allocating, to the first load operating system, the physical resource set exclusively used by the first load operating system; in this case, the first load operating system determines that a physical resource needs to be added for the first load operating system, and sends a resource adding request message to the management operating system. Because there are three types of physical resources, the first load operating system determines, according to utilization of each physical resource, a type identifier of the physical resource that needs to be added. Therefore, the resource adding request message includes the type identifier of the physical resource that needs to be added, where the type identifier of the physical resource is used to distinguish whether the physical resource that needs to be added is a processor core resource, a physical memory resource, or an external device resource.

The foregoing two possible implementation manners separately describe, from perspectives of the management operating system and the first load operating system, that a physical resource of the first load operating system needs to be added or reduced. The following describes in detail, according to a type of a physical resource, adding or reduction of each physical resource.

Figure 8A:
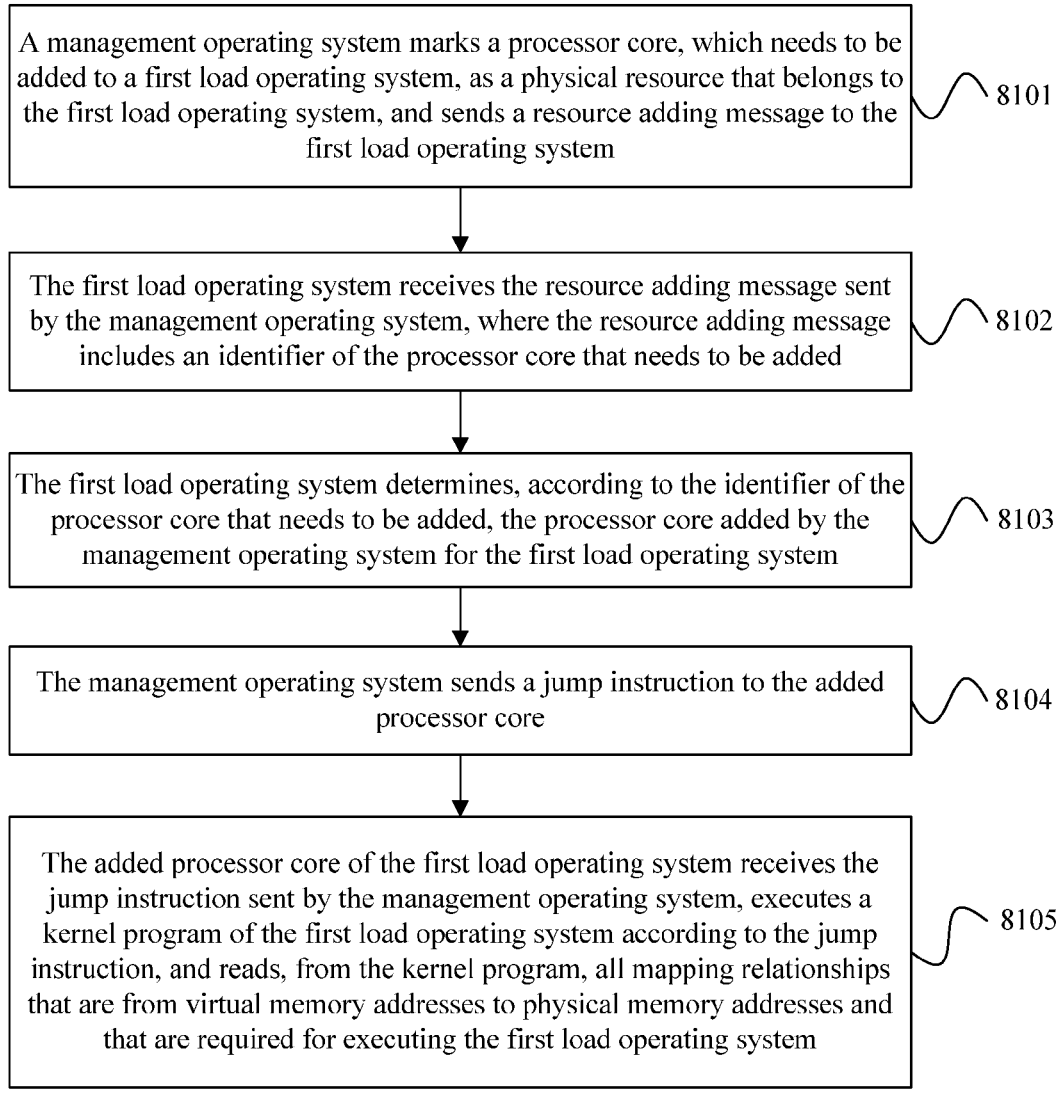
FIG. 8A is a schematic flowchart for adding a processor core for a first load operating system according to the present disclosure.
Figure 8B:
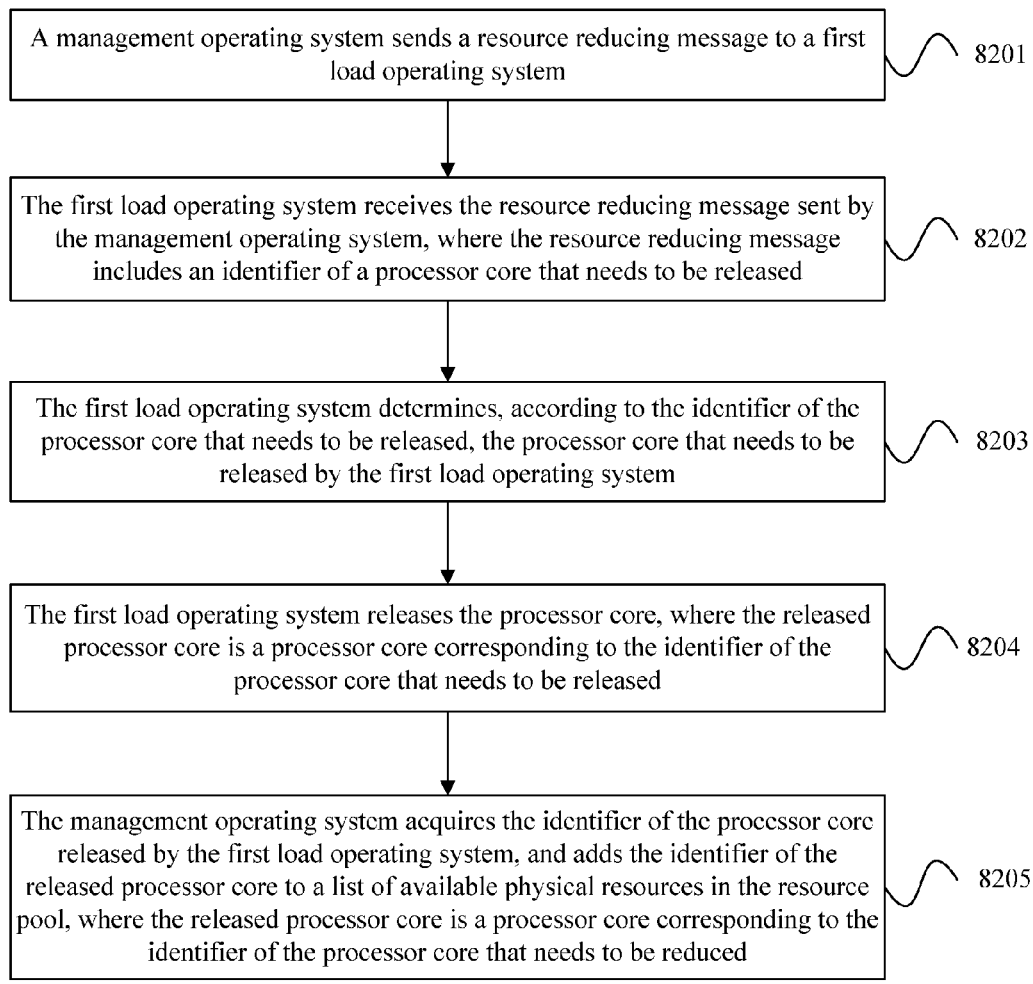
FIG. 8B is a schematic flowchart for releasing a processor core by a first load operating system according to the present disclosure.

FIG. 8A is a schematic flowchart for adding a processor core for the first load operating system when the physical resource is a processor core according to the present disclosure. FIG. 8B is a schematic flowchart for releasing a processor core by the first load operating system according to the present disclosure.

As shown in FIG. 8A, adding the processor core for the first load operating system includes the following steps:

Step 8101: The management operating system marks the processor core, which needs to be added for the first load operating system, as a physical resource that belongs to the first load operating system, and sends a resource adding message to the first load operating system.

The resource adding message includes an identifier of the processor core that needs to be added.

Specifically, the management operating system marks the processor core, which needs to be added for the first load operating system, as the physical resource that belongs to the first load operating system, where the added processor core is not used as an available physical resource in the physical resource pool, and the management operating system and the first load operating system monitor utilization of the added processor core.

Step 8102: The first load operating system receives the resource adding message sent by the management operating system, where the resource adding message includes an identifier of the processor core that needs to be added.

Step 8103: The first load operating system determines, according to the identifier of the processor core that needs to be added, the processor core added by the management operating system for the first load operating system.

Step 8104: The management operating system sends a jump instruction to the added processor core.

The jump instruction is used to instruct the added processor core to execute a kernel program of the first load operating system, and instruct the added processor core to read, from the kernel program, all mapping relationships that are from virtual memory addresses to physical memory addresses and that are required for executing the first load operating system.

The management operating system sets, for the first load operating system, the kernel program in a preset fixed physical memory, and the management operating system and the first load operating system agree in advance on that the first load operating system may write, into the kernel program, the all mapping relationships that are from virtual memory addresses to the physical memory addresses and that are required for executing the first load operating system. Persons skilled in the art can understand that the kernel program may further include other information required for running the added processor core, on which this embodiment imposes no special limitation.

Step 8105: The added processor core of the first load operating system receives the jump instruction sent by the management operating system, executes a kernel program of the first load operating system according to the jump instruction, and reads, from the kernel program, all mapping relationships that are from virtual memory addresses to physical memory addresses and that are required for executing the first load operating system.

As shown in FIG. 8B, releasing the processor core by the first load operating system includes the following steps:

Step 8201: The management operating system sends a resource reducing message to the first load operating system.

The resource reducing message includes an identifier of the processor core that needs to be released.

Step 8202: The first load operating system receives the resource reducing message sent by the management operating system, where the resource reducing message includes an identifier of the processor core that needs to be released.

Step 8203: The first load operating system determines, according to the identifier of the processor core that needs to be released, the processor core that needs to be released by the first load operating system.

Step 8204: The first load operating system releases the processor core, where the released processor core is a processor core corresponding to the identifier of the processor core that needs to be released.

That the first load operating system releases the processor core refers to that the first load operating system no longer uses the processor core.

Step 8205: The management operating system acquires the identifier of the processor core released by the first load operating system, and adds the identifier of the released processor core to a list of available physical resources in the resource pool, where the released processor core is a processor core corresponding to the identifier of the processor core that needs to be reduced.

Figure 9A:
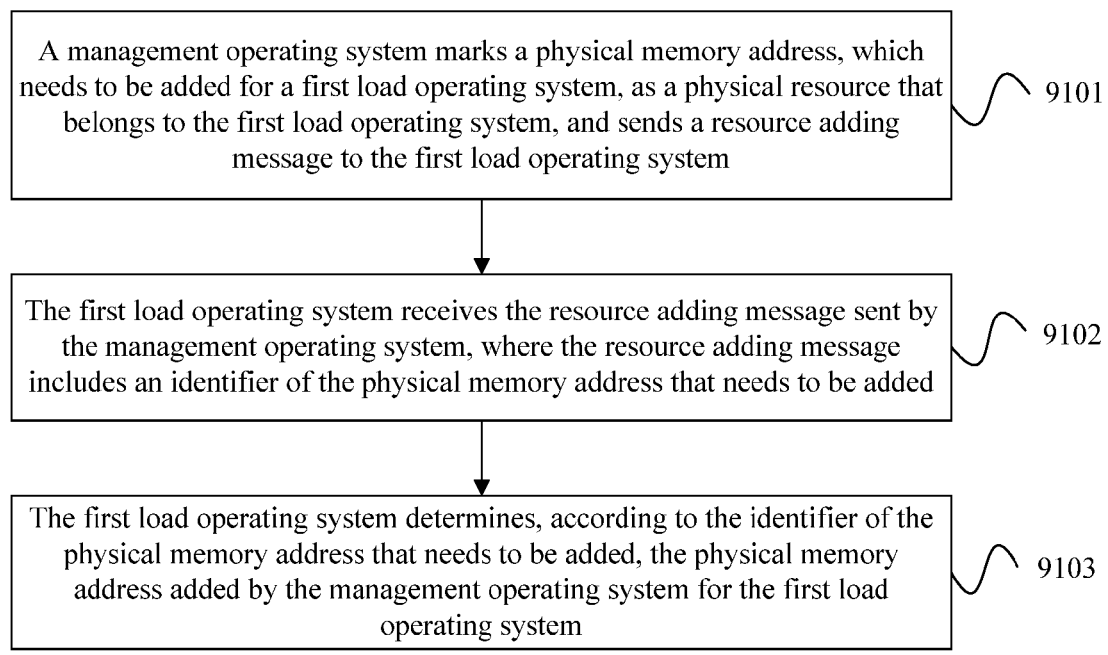
FIG. 9A is a schematic flowchart for adding a physical memory address for a first load operating system according to the present disclosure.
Figure 9B:
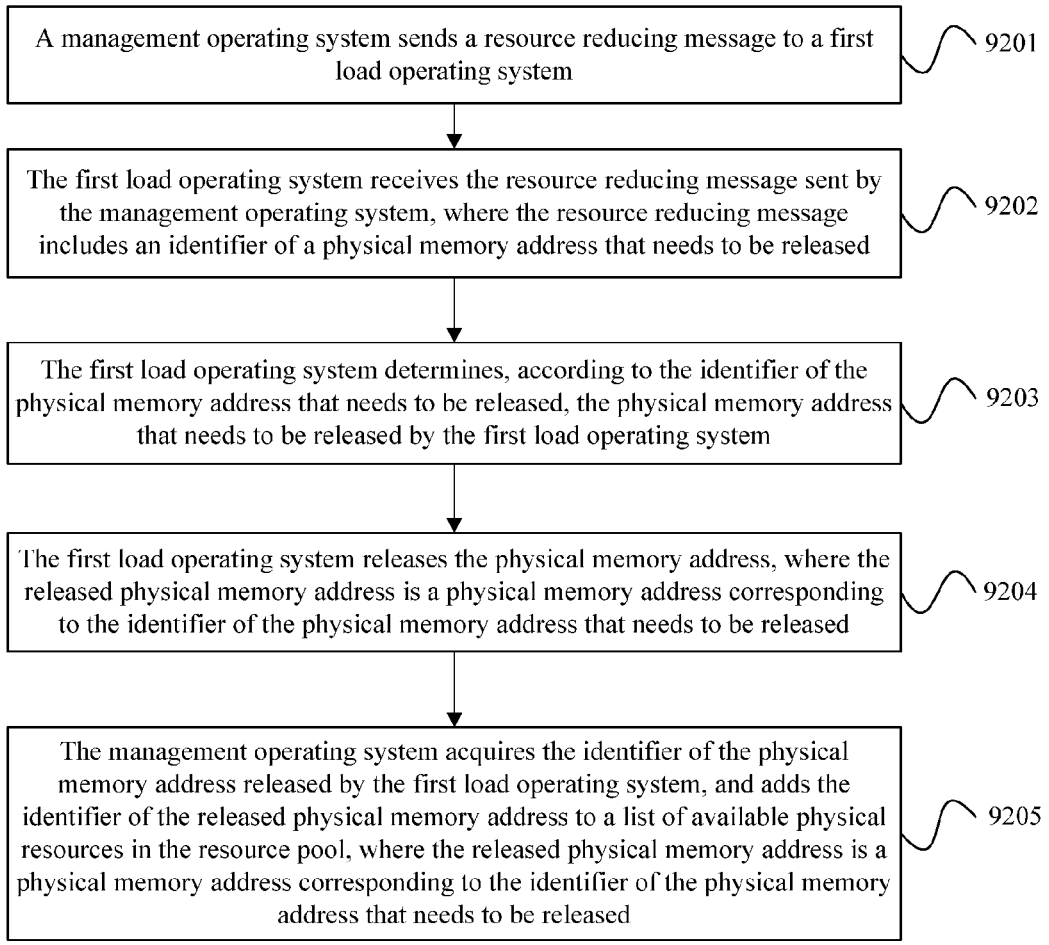
FIG. 9B is a schematic flowchart for releasing a physical memory address by a first load operating system according to the present disclosure.

FIG. 9A is a schematic flowchart for adding a physical memory address for the first load operating system when the physical resource is a physical memory resource according to the present disclosure. FIG. 9B is a schematic flowchart for releasing a physical memory address by the first load operating system according to the present disclosure.

As shown in FIG. 9A, adding the physical memory address for the first load operating system includes the following steps:

Step 9101: The management operating system marks the physical memory address, which needs to be added for the first load operating system, as a physical resource that belongs to the first load operating system, and sends a resource adding message to the first load operating system.

The resource adding message includes an identifier of the physical memory address that needs to be added.

The management operating system marks the physical memory address, which needs to be added for the first load operating system, as the physical resource that belongs to the first load operating system, where the added physical memory address is not used as an available physical resource in the physical resource pool, and the management operating system and the first load operating system monitor utilization of the added physical memory address; the first load operating system further constructs a mapping relationship that is from a virtual memory address to the added physical memory address.

Step 9102: The first load operating system receives the resource adding message sent by the management operating system, where the resource adding message includes an identifier of the physical memory address that needs to be added.

Step 9103: The first load operating system determines, according to the identifier of the physical memory address that needs to be added, the physical memory address added by the management operating system for the first load operating system.

As shown in FIG. 9B, releasing the physical memory address by the first load operating system includes the following steps:

Step 9201: The management operating system sends a resource reducing message to the first load operating system.

The resource reducing message includes an identifier of the physical memory address that needs to be released.

Step 9202: The first load operating system receives the resource reducing message sent by the management operating system, where the resource reducing message includes an identifier of the physical memory address that needs to be released.

Step 9203: The first load operating system determines, according to the identifier of the physical memory address that needs to be released, the physical memory address that needs to be released by the first load operating system.

Step 9204: The first load operating system releases the physical memory address, where the released physical memory address is a physical memory address corresponding to the identifier of the physical memory address that needs to be released.

Step 9205: The management operating system acquires the identifier of the physical memory address released by the first load operating system, and adds the identifier of the released physical memory address to a list of available physical resources in the resource pool, where the released physical memory address is a physical memory address corresponding to the identifier of the physical memory address that needs to be released.

Figure 10A:
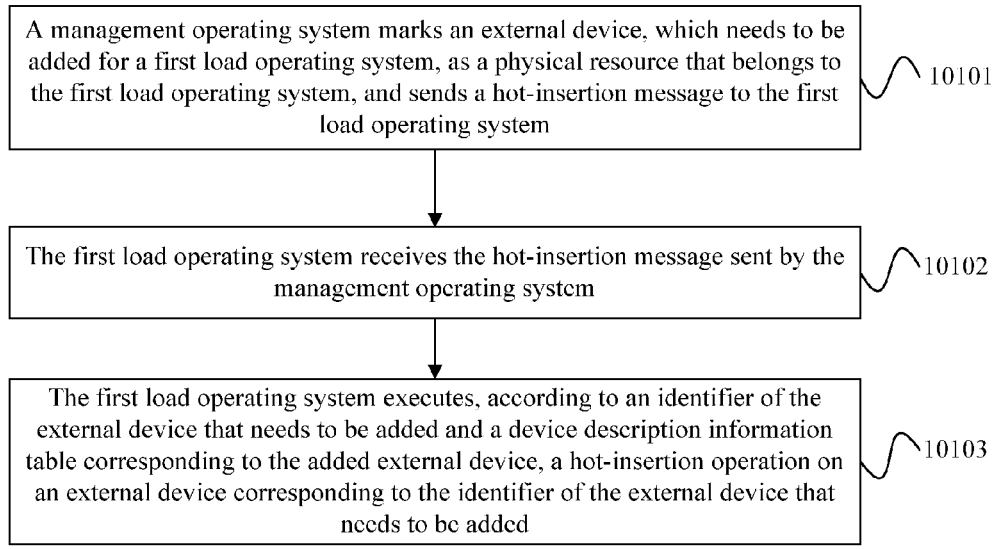
FIG. 10A is a schematic flowchart for adding an external device for a first load operating system according to the present disclosure.
Figure 10B:
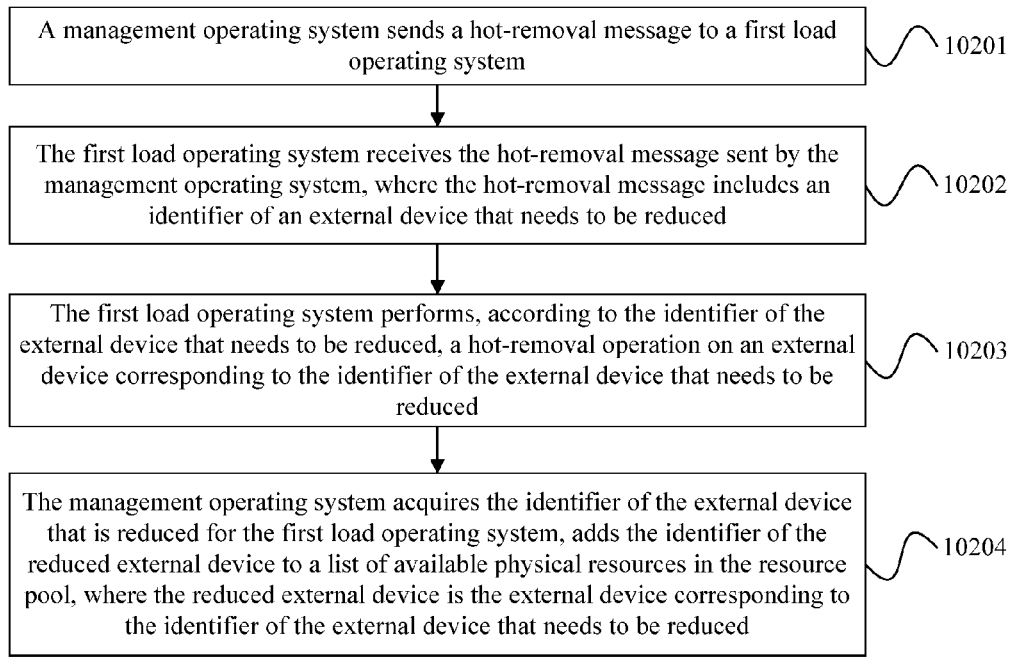
FIG. 10B is a schematic flowchart for reducing an external device for a first load operating system according to the present disclosure.

FIG. 10A is a schematic flowchart for adding an external device for the first load operating system when the physical resource is an external device resource according to the present disclosure. FIG. 10B is a schematic flowchart for reducing an external device for the first load operating system according to the present disclosure.

As shown in FIG. 10A, adding the external device for the first load operating system includes the following steps:

Step 10101: The management operating system marks the external device, which needs to be added for the first load operating system, as a physical resource that belongs to the first load operating system, and sends a hot-insertion message to the first load operating system.

The hot-insertion message is used to instruct the first load operating system to acquire an identifier of the external device that needs to be added and a device description information table corresponding to the added external device.

Specifically, the management operating system marks the external device, which needs to be added for the first load operating system, as the physical resource that belongs to the first load operating system, where the added external device is not used as an available physical resource in the physical resource pool, and the management operating system and the first load operating system monitor utilization of the added external device.

That the hot-insertion message is used to instruct the first load operating system to acquire an identifier of the external device that needs to be added and a device description information table corresponding to the added external device includes two possible implementation manners:

In one possible implementation manner: the management operating system sends the hot-insertion message to the first load operating system, where the hot-insertion message includes the identifier of the external device that needs to be added and the device description information table corresponding to the added external device.

In the other possible implementation manner: the management operating system sends a hot-insertion instruction message to the first load operating system, where the hot-insertion instruction message is used to instruct the first load operating system to read, from a preset fixed physical memory, the identifier of the external device that needs to be added and the device description information table corresponding to the added external device.

Step 10102: The first load operating system receives the hot-insertion message sent by the management operating system.

Step 10103: The first load operating system executes, according to an identifier of the external device that needs to be added and a device description information table corresponding to the added external device, a hot-insertion operation on an external device corresponding to the identifier of the external device that needs to be added.

As shown in FIG. 10B, reducing the external device for the first load operating system includes the following steps:

Step 10201: The management operating system sends a hot-removal message to the first load operating system.

The hot-removal message includes an identifier of the external device that needs to be reduced.

Step 10202: The first load operating system receives the hot-removal message sent by the management operating system, where the hot-removal message includes an identifier of the external device that needs to be reduced.

Step 10203: The first load operating system performs, according to the identifier of the external device that needs to be reduced, a hot-removal operation on an external device corresponding to the identifier of the external device that needs to be reduced.

Step 10204: The management operating system acquires the identifier of the external device that is reduced for the first load operating system, adds the identifier of the reduced external device to a list of available physical resources in the resource pool, where the reduced external device is the external device corresponding to the identifier of the external device that needs to be reduced.

In the embodiments of the present disclosure, dynamic adjustment of a physical resource is implemented in the foregoing manners, so that not only a first load operating system can exclusively use a physical resource, but also utilization of a physical resource is improved by adding or reducing a physical resource of the first load operating system.

Figure 11:
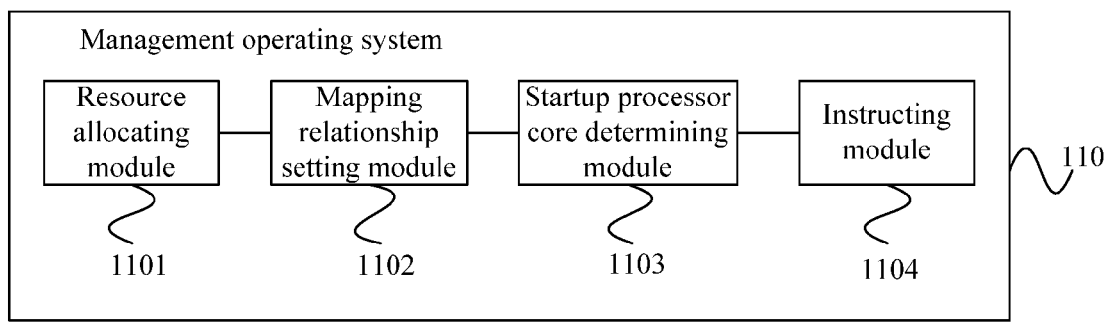
FIG. 11 is a schematic structural diagram of Embodiment 1 of a management operating system according to the present disclosure.

FIG. 11 is a schematic structural diagram of Embodiment 1 of a management operating system according to the present disclosure. The management operating system in this embodiment is applied to the multi-core operating system shown in FIG. 1, where the multi-core operating system includes the management operating system and multiple load operating systems that run on a host machine and includes a physical resource pool, and the physical resource pool includes processor cores and a physical memory that are of the host machine. As shown in FIG. 11, the management operating system 110 provided in this embodiment includes a resource allocating module 1101, a mapping relationship setting module 1102, a startup processor core determining module 1103, and an instructing module 1104.

The resource allocating module 1101 is configured to allocate, to each load operating system, a physical resource set exclusively used by each load operating system, where each physical resource set includes some of the processor cores of the host machine and a part of the physical memory of the host machine.

The mapping relationship setting module 1102 is configured to: construct a startup mirror for each load operating system, and set, for each load operating system, a mapping relationship that is from a virtual memory address to a physical memory address and that is required for executing the startup mirror.

The startup processor core determining module 1103 is configured to determine, in processor cores allocated to a first load operating system, a startup processor core that starts up the first load operating system, where the first load operating system is any one of the load operating systems.

The instructing module 1104 is configured to instruct the startup processor core to read a mapping relationship that is from a virtual memory address to a physical memory address and that is required for executing a startup mirror of the first load operating system and is pre-constructed by the mapping relationship setting module, so as to enable the startup processor core to access, in a process of executing the startup mirror and according to the mapping relationship, the physical memory address; and instruct the startup processor core to execute the startup mirror pre-constructed for the first load operating system, where the startup mirror includes a startup parameter of the first load operating system, the startup parameter includes identifiers of the processor cores allocated to the first load operating system and an identifier of the physical memory address allocated to the first load operating system.

The management operating system provided in this embodiment may execute the technical solutions of the foregoing resource processing method embodiments, and has a similar implementation principle and technical effect, and no detail is repeatedly described herein in this embodiment.

Figure 12:
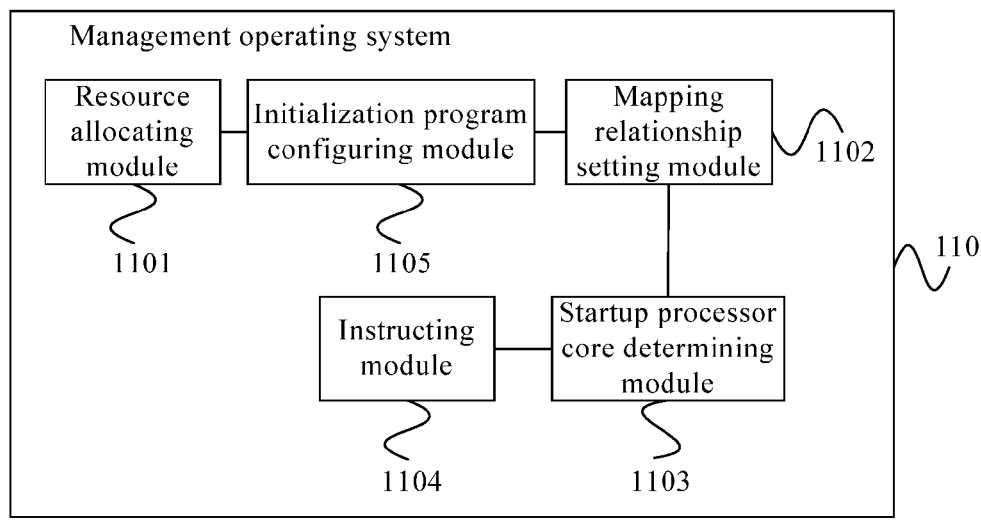
FIG. 12 is a schematic structural diagram of Embodiment 2 of a management operating system according to the present disclosure.

FIG. 12 is a schematic structural diagram of Embodiment 2 of a management operating system according to the present disclosure. This embodiment is implemented based on the embodiment in FIG. 11, and is specifically as follows:

Optionally, the instructing module 1104 is specifically configured to:

send an inter-core interrupt message to the startup processor core, where the inter-core interrupt message instructs the startup processor core to execute an initialization program that is configured to initialize the startup processor core and that is corresponding to the first load operating system; and instruct, by instructing the startup processor core to execute the initialization program corresponding to the first load operating system, the startup processor core to read, from the initialization program, the mapping relationship that is from the virtual memory address to the physical memory address and that is required for executing the startup mirror of the first load operating system; and instruct the startup processor core to jump, after running of the initialization program ends, to the location that is of the startup mirror and is in the physical memory, so as to execute the startup mirror of the first load operating system.

Optionally, the management operating system further includes an initialization program configuring module 1105, configured to: before the mapping relationship setting module sets, for each load operating system, the mapping relationship that is from the virtual memory address to the physical memory address and that is required for executing the startup mirror, preset, for the first load operating system, an initialization program that is configured to initialize the first load operating system, and preset, in the initialization program, the location that is of the startup mirror of the first load operating system and that is in the physical memory address.

The mapping relationship setting module 1102 is specifically configured to set, in the initialization program and for the first load operating system, the mapping relationship that is from the virtual memory address to the physical memory address and that is required for executing the startup mirror.

The management operating system provided in this embodiment may execute the technical solutions of the foregoing resource processing method embodiments, and has a similar implementation principle and technical effect, and no detail is repeatedly described herein in this embodiment.

Figure 13:
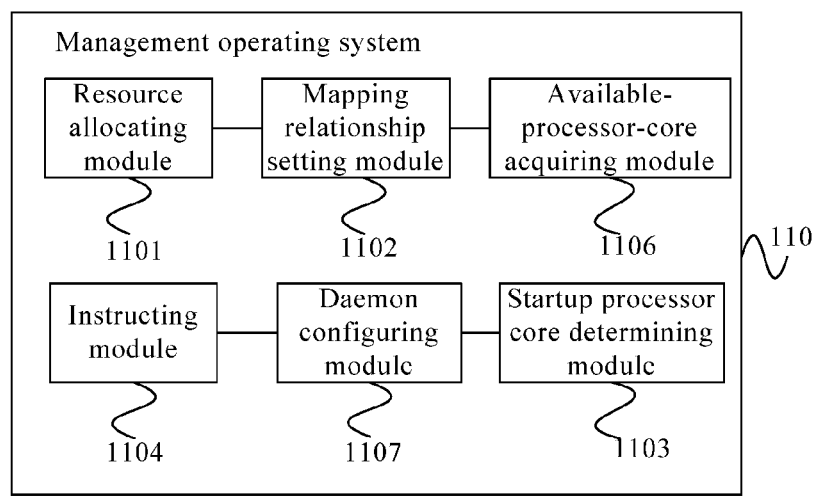
FIG. 13 is a schematic structural diagram of Embodiment 3 of a management operating system according to the present disclosure.

FIG. 13 is a schematic structural diagram of Embodiment 3 of a management operating system according to the present disclosure. This embodiment is implemented based on the embodiment in FIG. 11, and is specifically as follows:

Optionally, the management operating system further includes an available-processor-core acquiring module 1106, configured to acquire available processor cores of a second load operating system before the startup processor core determining module determines, in the processor cores allocated to the first load operating system, the startup processor core that starts up the first load operating system, where the second load operating system is a logged-out load operating system, other than the first load operating system, in the multiple load operating systems, the available processor cores include a processor core that has been started up, and a physical resource set of the first load operating system includes the available processor cores.

The startup processor core determining module 1103 is specifically configured to: when the physical resource set of the first load operating system includes the available processor cores, determine, in the available processor cores, the startup processor core that starts up the first load operating system.

Optionally, the management operating system further includes a daemon configuring module 1107, configured to preset, for the first load operating system, a daemon on the startup processor core after the startup processor core determining module determines, in the available processor cores, the startup processor core that starts up the first load operating system, and preset, in the daemon, a location that is of the startup mirror of the first load operating system and that is in the physical memory address.

The mapping relationship setting module 1102 is specifically configured to set, for the first load operating system and in the daemon, the mapping relationship that is from the virtual memory address to the physical memory address and that is required for executing the startup mirror.

Optionally, the instructing module 1104 is specifically configured to: send an inter-core interrupt message to the daemon running on the startup processor core, where the inter-core interrupt message instructs the startup processor core to read, from the daemon, the mapping relationship that is from the virtual memory address to the physical memory address and that is required for executing the startup mirror and is pre-constructed by the management operating system for the first load operating system; and the location that is of the startup mirror corresponding to the first load operating system, that is in the physical memory address, and that is preset in the daemon by the daemon configuring module instructs the startup processor core to jump to the location that is in the physical memory address and in which the startup mirror is located, so as to execute the startup mirror of the first load operating system.

The management operating system provided in this embodiment may execute the technical solutions of the foregoing resource processing method embodiments, and has a similar implementation principle and technical effect, and no detail is repeatedly described herein in this embodiment.

Based on the embodiments in FIG. 12 and FIG. 13, the resource allocating module is specifically configured to:

perform, according to a quantity of the load operating systems, first-time division on available physical resources that are in the physical resource pool and that are corresponding to identifiers of physical resources in a list of the available physical resources in the resource pool, to obtain multiple physical resource sets, where a quantity of the physical resource sets equals the quantity of the load operating systems, and the management operating system determines a correspondence between each load operating system and each physical resource set; and allocate, to each load operating system according to the correspondence, the physical resource set exclusively used by each load operating system.

Optionally, each physical resource set further includes some external devices of the host machine.

The startup parameter further includes an identifier of an external device allocated to the first load operating system and a device description information table corresponding to the external device.

Based on the embodiments in FIG. 12 and FIG. 13, when the management operating system monitors running of the first load operating system, a structure of the management operating system includes two possible implementation manners.

One possible implementation manner is that the management operating system further includes:

a first monitoring module, configured to monitor, after the instructing module instructs the startup processor core to execute the startup mirror pre-constructed for the first load operating system, running of the first load operating system; and a first resource managing module, configured to determine that a physical resource needs to be reduced for the first load operating system if a monitoring result of the first monitoring module is that utilization of a physical resource allocated to the first load operating system is less than a first preset threshold, and determine a type identifier of the physical resource that needs to be reduced, where the type identifier of the physical resource is used to distinguish whether the physical resource is a processor core resource, a physical memory resource, or an external device resource.

The resource allocating module is further configured to perform, according to the type identifier of the physical resource that needs to be reduced, second-time division on the available physical resources that are in the physical resource pool and that are corresponding to the identifiers of the physical resources in the list of the available physical resources in the resource pool, and reduce the physical resource of the first load operating system, where the reduced physical resource is a physical resource corresponding to the type identifier of the physical resource that needs to be reduced.

The other possible implementation manner is that the management operating system further includes:

a second monitoring module, configured to monitor, after the instructing module instructs the startup processor core to execute the startup mirror pre-constructed for the first load operating system, running of the first load operating system; and a second resource managing module, configured to determine that a physical resource needs to be added for the first load operating system if a monitoring result of the second monitoring module is that utilization of a physical resource allocated to the first load operating system is greater than a second preset threshold, and determine a type identifier of the physical resource that needs to be added, where the type identifier of the physical resource is used to distinguish whether the physical resource that needs to be added is a processor core resource, a physical memory resource, or an external device resource.

The resource allocating module is further configured to perform, according to the type identifier of the physical resource that needs to be added, second-time division on the available physical resources that are in the physical resource pool and that are corresponding to the identifiers of the physical resources in the list of the available physical resources in the resource pool, and add the physical resource of the first load operating system, where the added physical resource is a physical resource corresponding to the type identifier of the physical resource that needs to be added.

Based on the embodiments in FIG. 12 and FIG. 13, when the management operating system monitors running of the first load operating system, a structure of the management operating system includes two possible implementation manners.

One possible implementation manner is that the management operating system further includes:

a first receiving module, configured to receive, after the instructing module instructs the startup processor core to execute the startup mirror pre-constructed for the first load operating system, a resource reducing request message sent by the first load operating system, where the resource reducing request message includes a type identifier of a physical resource that needs to be reduced, and the type identifier of the physical resource is used to distinguish whether the physical resource is a processor core resource, a physical memory resource, or an external device resource.

The resource allocating module is further configured to perform, according to the type identifier, of the physical resource that needs to be reduced, in the resource reducing request message, second-time division on the available physical resources that are in the physical resource pool and that are corresponding to the identifiers of the physical resources in the list of the available physical resources in the resource pool, and reduce the physical resource of the first load operating system, where the reduced physical resource is a physical resource corresponding to the type identifier of the physical resource that needs to be reduced.

The other possible implementation manner is that the management operating system further includes:

a second receiving module, configured to receive, after the instructing module instructs the startup processor core to execute the startup mirror pre-constructed for the first load operating system, a resource adding request message sent by the first load operating system, where the resource adding request message includes a type identifier of a physical resource that needs to be added, and the type identifier of the physical resource is used to distinguish whether the physical resource is a processor core resource, a physical memory resource, or an external device resource.

The resource allocating module is further configured to perform, according to the type identifier, of the physical resource that needs to be added, in the resource adding request message, second-time division on the available physical resources that are in the physical resource pool and that are corresponding to the identifiers of the physical resources in the list of the available physical resources in the resource pool, and add the physical resource of the first load operating system, where the added physical resource is a physical resource corresponding to the type identifier of the physical resource that needs to be added.

Based on the foregoing embodiments, if the physical resource that needs to be added is a processor core, the resource allocating module is further specifically configured to:

mark the processor core, which needs to be added for the first load operating system, as a physical resource that belongs to the first load operating system, and send a resource adding message to the first load operating system, where the resource adding message includes an identifier of the processor core that needs to be added; and send a jump instruction to the added processor core, where the jump instruction is used to instruct the added processor core to execute a kernel program of the first load operating system, and instruct the added processor core to read, from the kernel program, all mapping relationships that are from virtual memory addresses to physical memory addresses and that are required for executing the first load operating system.

Based on the foregoing embodiments, if the physical resource that needs to be reduced is a processor core, the resource allocating module is further specifically configured to:

send a resource reducing message to the first load operating system, where the resource reducing message includes an identifier of the processor core that needs to be released; and acquire the identifier of the processor core released by the first load operating system, and add the identifier of the released processor core to the list of the available physical resources in the resource pool, where the released processor core is a processor core corresponding to the identifier of the processor core that needs to be reduced.

Based on the foregoing embodiments, if the physical resource that needs to be added is a physical memory resource, the resource allocating module is further specifically configured to: mark a physical memory address, which needs to be added for the first load operating system, as a physical resource that belongs to the first load operating system, and send a resource adding message to the first load operating system, where the resource adding message includes an identifier of the physical memory address that needs to be added.

Based on the foregoing embodiments, if the physical resource that needs to be reduced is a physical memory resource, the resource allocating module is further specifically configured to: send a resource reducing message to the first load operating system, where the resource reducing message includes an identifier of a physical memory address that needs to be released; and acquire an identifier of the physical memory address released by the first load operating system, and add the identifier of the released physical memory address to the list of the available physical resources in the resource pool, where the released physical memory address is a physical memory address corresponding to the identifier of the physical memory address that needs to be released.

Based on the foregoing embodiments, if the physical resource that needs to be added is an external device resource, the resource allocating module is further specifically configured to: mark an external device, which needs to be added for the first load operating system, as a physical resource that belongs to the first load operating system, and send a hot-insertion message to the first load operating system, where the hot-insertion message is used to instruct the first load operating system to acquire an identifier of the external device that needs to be added and a device description information table corresponding to the added external device.

Based on the foregoing embodiments, if the physical resource that needs to be reduced is an external device resource, the resource allocating module is further specifically configured to: send a hot-removal message to the first load operating system, where the hot-removal message includes an identifier of an external device that needs to be reduced; and acquire the identifier of the external device reduced for the first load operating system, and add the identifier of the reduced external device to the list of the available physical resources in the resource pool, where the reduced external device is an external device corresponding to the identifier of the external device that needs to be reduced.

The management operating system provided in this embodiment may execute the technical solutions of the foregoing resource processing method embodiments, and has a similar implementation principle and technical effect, and no detail is repeatedly described herein in this embodiment.

Based on the embodiments in FIG. 11 to FIG. 13, the management operating system may further include another module required for running, for example:

an inter-instance communication module, configured to implement bottom-layer communication between the management operating system and another load operating system, where notification and response are generally performed not by using a network but in an inter-processor interrupt manner;

a resource runtime assisting module, where because of a limitation of a hardware function, when an interrupt of an external device cannot be directly routed to a load operating system, the resource runtime assisting module of the management operating system may forward the interrupt, and help to implement normal response to the interrupt; or when the hardware function fully supports automatic routing of an interrupt and free configuration of direct memory access (Direct Memory Access, DMA for short), that is, when an interrupt of an external device is directly routed to a load operating system, the resource runtime assisting module may be canceled;

a terminal service module: configured to prepare a virtual terminal device for a Light OS that needs a terminal (a keyboard, a mouse, or a graphics card), ensure communication efficiency by using a mechanism such as memory sharing, and provide support in running; and an application managing module, configured to virtualize a user-oriented management interface of a system, make it easy for a user to manage a complicated application, and develop an appropriate application scheduling policy.

Figure 14:
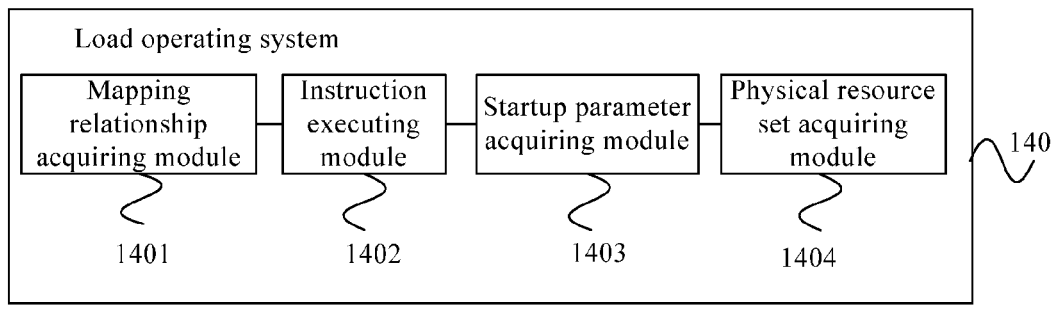
FIG. 14 is a schematic structural diagram of Embodiment 1 of a load operating system according to the present disclosure.

FIG. 14 is a schematic structural diagram of Embodiment 1 of a load operating system according to the present disclosure. The load operating system provided in this embodiment is applied to the multi-core operating system shown in FIG. 1, where the multi-core operating system includes a management operating system and multiple load operating systems that run on a host machine and includes a physical resource pool, the physical resource pool includes processor cores and a physical memory that are of the host machine, each load operating system exclusively uses a physical resource set allocated by the management operating system, and each physical resource set includes some of the processor cores of the host machine and a part of the physical memory of the host machine; the management operating system pre-constructs a startup mirror for each load operating system, and sets, for each load operating system, a mapping relationship that is from a virtual memory address to a physical memory address and that is required for executing the startup mirror; and the load operating system 140 includes a mapping relationship acquiring module 1401, an instruction executing module 1402, a startup parameter acquiring module 1403, and a physical resource set acquiring module 1404.

The mapping relationship acquiring module 1401 is configured to read a mapping relationship that is from a virtual memory address to a physical memory address and that is required for executing a startup mirror of a first load operating system, where the mapping relationship is used to enable a startup processor core of the first load operating system to access the physical memory address, and the first load operating system is any load operating system in the multi-core operating system.

The instruction executing module 1402 is configured to jump, according to an instruction that is set by the management operating system and that is for executing a startup mirror jump, to a location that is of the startup mirror corresponding to the first load operating system and that is in the physical memory address, and execute, according to the mapping relationship, the startup mirror corresponding to the first load operating system.

The startup parameter acquiring module 1403 is configured to acquire, in a process of executing the startup mirror of the first load operating system by the instruction executing module, a startup parameter of the first load operating system from the startup mirror of the first load operating system, where the startup parameter includes identifiers of processor cores allocated to the first load operating system and an identifier of the physical memory address allocated to the first load operating system.

The physical resource set acquiring module 1404 is configured to determine, according to the identifiers of the processor cores and the identifier of the physical memory address of the first load operating system, a physical resource set that is allocated by the management operating system to the first load operating system and that is exclusively used by the first load operating system.

The load operating system provided in this embodiment may execute the technical solutions of the foregoing resource processing method embodiments, and has a similar implementation principle and technical effect, and no detail is repeatedly described herein in this embodiment.

Figure 15:
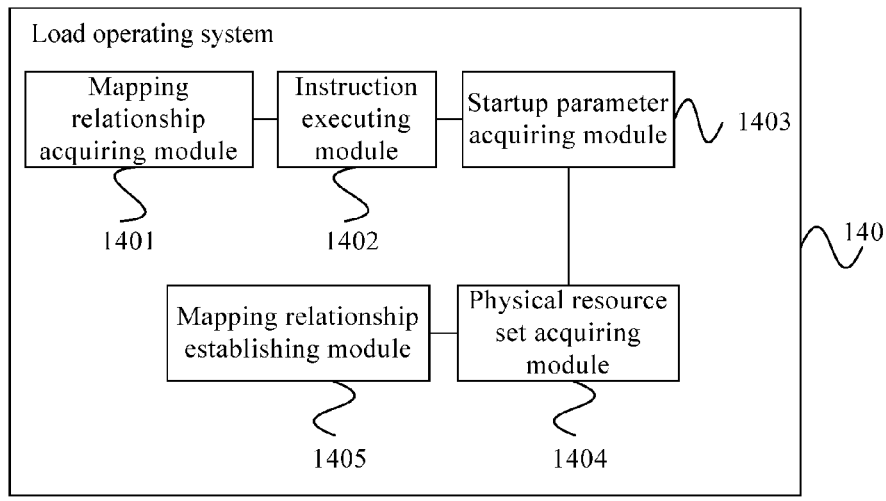
FIG. 15 is a schematic structural diagram of Embodiment 2 of a load operating system according to the present disclosure.

FIG. 15 is a schematic structural diagram of Embodiment 2 of a load operating system according to the present disclosure. This embodiment is implemented based on the embodiment in FIG. 14, and is specifically as follows:

Optionally, the mapping relationship acquiring module 1401 is specifically configured to:

receive an inter-core interrupt message sent by the management operating system, where the startup processor core executes, according to an instruction of the inter-core interrupt message, an initialization program that is configured to initialize the startup processor core and that is corresponding to the first load operating system; and execute the initialization program, and read, from the initialization program, the mapping relationship that is from the virtual memory address to the physical memory address and that is required for executing the startup mirror and is pre-constructed by the management operating system for the first load operating system.

The instruction executing module 1402 is specifically configured to: execute the initialization program, read, from the initialization program, a jump instruction that is preset in the initialization program by the management operating system, and jump to the location that is of the startup mirror corresponding to the first load operating system and that is in the physical memory address.

Optionally, the startup processor core of the first load operating system is a processor core that has been started up and that is determined by the management operating system, a daemon runs on the startup processor core of the first load operating system, the daemon is preset by the management operating system for the first load operating system, the location that is of the startup mirror corresponding to the first load operating system and that is in the physical memory address and the mapping relationship that is from the virtual memory address to the physical memory address and that is required for executing the startup mirror are set in the daemon.

Optionally, the mapping relationship acquiring module 1401 is specifically configured to read, from the daemon and according to an instruction of an inter-core interrupt message after the daemon running on the startup processor core receives the inter-core interrupt message sent by the management operating system, the mapping relationship that is from the virtual memory address to the physical memory address and that is required for executing the startup mirror and is pre-constructed by the management operating system for the first load operating system.

The instruction executing module 1402 is specifically configured to: read a jump instruction that is preset in the daemon by the management operating system, and jump to the location that is of the startup mirror corresponding to the first load operating system and that is in the physical memory address.

Optionally, each physical resource set further includes some external devices of the host machine; and the startup parameter further includes an identifier of an external device allocated by the management operating system to the first load operating system and a device description information table corresponding to the external device.

Optionally, the load operating system further includes a mapping relationship constructing module 1405, configured to construct, after the physical resource set acquiring module determines the physical resource set that is allocated by the management operating system to the first load operating system and that is exclusively used by the first load operating system, all mapping relationships that are from virtual memory addresses to physical memory addresses and that are required for executing the first load operating system; and access the physical memory address according to all the mapping relationships that are from the virtual memory addresses to the physical memory addresses and that are required for executing the first load operating system.

Optionally, the instruction executing module 1402 is further configured to: after the physical resource set acquiring module determines the physical resource set that is allocated by the management operating system to the first load operating system and that is exclusively used by the first load operating system, execute, by using the processor cores allocated to the first load operating system, a privileged instruction delivered by the management operating system.

The load operating system provided in this embodiment may execute the technical solutions of the foregoing resource processing method embodiments, and has a similar implementation principle and technical effect, and no detail is repeatedly described herein in this embodiment.

Based on the embodiment in FIG. 15, the first load operating system monitors a physical resource of the first load operating system, and implements dynamic resource adjustment; optionally, the load operating system further includes:

a first monitoring module, configured to monitor a physical resource of the first load operating system after the physical resource set acquiring module determines the physical resource set that is allocated by the management operating system to the first load operating system and that is exclusively used by the first load operating system; and a first sending module, configured to send a resource reducing request message to the management operating system if a monitoring result of the first monitoring module is that utilization of the physical resource allocated by the management operating system to the first load operating system is less than a first preset threshold, where the resource reducing request message includes a type identifier of a physical resource that needs to be reduced, and the type identifier of the physical resource is used to distinguish whether the physical resource that needs to be reduced is a processor core resource, a physical memory resource, or an external device resource.

Optionally, the load operating system further includes:

a second monitoring module, configured to monitor a physical resource of the first load operating system after the physical resource set acquiring module determines the physical resource set that is allocated by the management operating system to the first load operating system and that is exclusively used by the first load operating system; and a second sending module, configured to send a resource adding request message to the management operating system if a monitoring result of the first monitoring module is that utilization of the physical resource allocated by the management operating system to the first load operating system is greater than a second preset threshold, where the resource adding request message includes a type identifier of a physical resource that needs to be added, and the type identifier of the physical resource is used to distinguish whether the physical resource that needs to be added is a processor core resource or a physical memory resource.

Optionally, if the physical resource that needs to be added is a processor core, the physical resource set acquiring module is further specifically configured to: after the second sending module sends the resource adding request message to the management operating system, receive a resource adding message sent by the management operating system, where the resource adding message includes an identifier of the processor core that needs to be added; and determine, according to the identifier of the processor core that needs to be added, the processor core added by the management operating system for the first load operating system; and when the added processor core of the first load operating system receives a jump instruction sent by the management operating system, execute a kernel program of the first load operating system according to the jump instruction, and read, from the kernel program, all mapping relationships that are from virtual memory addresses to physical memory addresses and that are required for executing the first load operating system, where the first load operating system presets, in the kernel program, all the mapping relationships that are from the virtual memory addresses to the physical memory addresses and that are required for executing the first load operating system.

Optionally, if the physical resource that needs to be reduced is a processor core, the physical resource set acquiring module is further specifically configured to: after the first sending module sends the resource reducing request message to the management operating system, receive a resource reducing message sent by the management operating system, where the resource reducing message includes an identifier of the processor core that needs to be released;

determine, according to the identifier of the processor core that needs to be released, the processor core that needs to be released by the first load operating system; and release the processor core, where the released processor core is a processor core corresponding to the identifier of the processor core that needs to be reduced.

Optionally, if the physical resource that needs to be added is a physical memory resource, the physical resource set acquiring module is further specifically configured to: after the second sending module sends the resource adding request message to the management operating system, receive a resource adding message sent by the management operating system, where the resource adding message includes an identifier of a physical memory address that needs to be added; and determine, according to the identifier of the physical memory address that needs to be added, the physical memory address added by the management operating system for the first load operating system.

Optionally, if the physical resource that needs to be reduced is a physical memory resource, the physical resource set acquiring module is further specifically configured to: after the first sending module sends the resource reducing request message to the management operating system, receive a resource reducing message sent by the management operating system, where the resource reducing message includes an identifier of a physical memory address that needs to be released;

determine, according to the identifier of the physical memory address that needs to be released, the physical memory address that needs to be released by the first load operating system, and release the physical memory address, where the released physical memory address is a physical memory address corresponding to the identifier of the physical memory address that needs to be released.

Optionally, if the physical resource that needs to be added is an external device resource, the physical resource set acquiring module is further specifically configured to: after the second sending module sends the resource adding request message to the management operating system, receive a hot-insertion message sent by the management operating system, where the hot-insertion message is used to instruct the first load operating system to acquire an identifier of an external device that needs to be added and a device description information table corresponding to the added external device;

execute, according to the identifier of the external device that needs to be added and the device description information table corresponding to the added external device, a hot-insertion operation on the external device corresponding to the identifier of the external device that needs to be added.

Optionally, if the physical resource that needs to be reduced is a physical memory resource, the physical resource set acquiring module is further specifically configured to: after the first sending module sends the resource reducing request message to the management operating system, receive a hot-removal message sent by the management operating system, where the hot-removal message includes an identifier of an external device that needs to be reduced;

execute, according to the identifier of the external device that needs to be reduced, a hot-removal operation on the external device corresponding to the identifier of the external device that needs to be reduced.

The load operating system provided in this embodiment may execute the technical solutions of the foregoing resource processing method embodiments, and has a similar implementation principle and technical effect, and no detail is repeatedly described herein in this embodiment.

Based on the embodiments in FIG. 14 and FIG. 15, the load operating system may further include another module required for running, for example:

an inter-instance communication module, configured to perform fast communication that is in the host machine and that is between the load operating system and the management operating system or another load operating system;

a virtual terminal, where by using a terminal virtualization service provided by the management operating system, the load operating system may be directly operated by a user in a terminal manner; and an application managing module, configured to receive an application deployed by the management operating system or by another application, and run and manage execution of the application.

Figure 16:
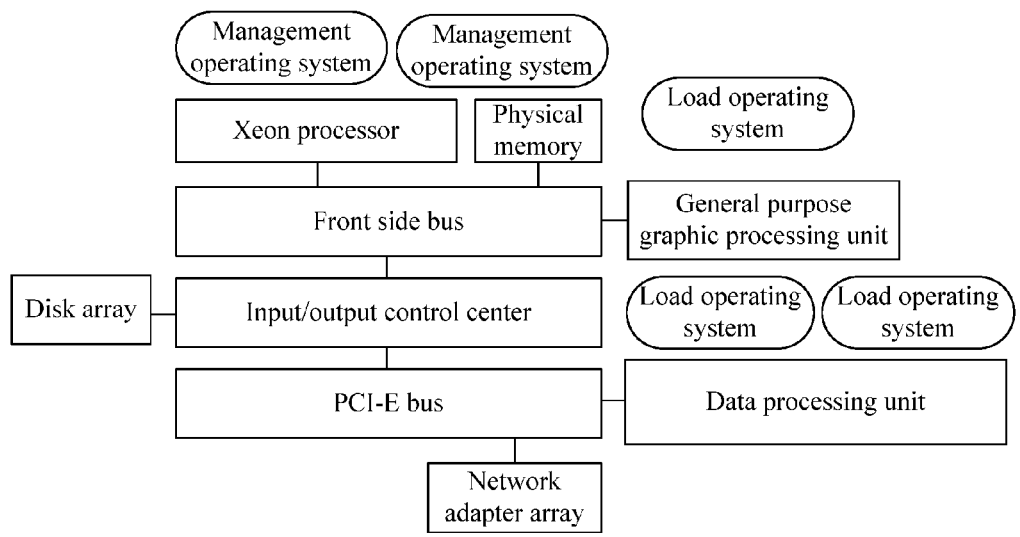
FIG. 16 is a schematic diagram of an architecture of a multi-core system on a heterogeneous platform.

FIG. 16 is a schematic diagram of an architecture of a multi-core system on a heterogeneous platform. As shown in FIG. 16, in this embodiment of a virtualization system according to the present disclosure, on a heterogeneous node, there are processors such as a data processing unit (DPU), a Xeon processor, and a general purpose graphic processing unit (GPGPU). Each processor includes multiple processor cores, and heterogeneous processors are interconnected by using a PCI-E bus and are combined in a non-uniform memory access (NUMA) manner. On the heterogeneous platform, there are also resources such as a physical memory, a disk array, and a network adapter array, which are connected by using devices such as a front side bus, an input/output control center, and a PCI bus.

In this embodiment, a management operating system and some load operating systems run on a processor core corresponding to the Xeon processor, and another customized load operating system runs on a processor core corresponding to another processor, for example, a GPGPU is suitable to run a computing task with a high degree of parallelism, and a DPU is suitable to run a data processing service. Therefore, load operating systems are separately customized for the GPGPU and the DPU according to a service type of each processor, for example, a load operating system customized for the GPGPU includes only a runtime library support for a basic matrix operation, and mainly supports languages such as computer unified device architecture (CUDA); and a load operating system customized for the DPU includes only a package support for data processing, mainly supports applications such as a distributed system infrastructure (for example, Hadoop), and excludes other computing components.

The management operating system may further manage a memory (for example, DRAM) connected by a PCI-E switch, start up, according to a configuration file designated by an administrator, multiple load operating systems that are on the DPU, and send a task to a load operating system by using an application management program. Optionally, for a data processing application, because a requirement of the application on a quantity of processes and threads is not high, when multiple cores optimize a data channel processing capability, support for data structures such as concurrent threads and processes may be reduced, thereby reducing space or performance overheads, and improving performance.

Figure 17:
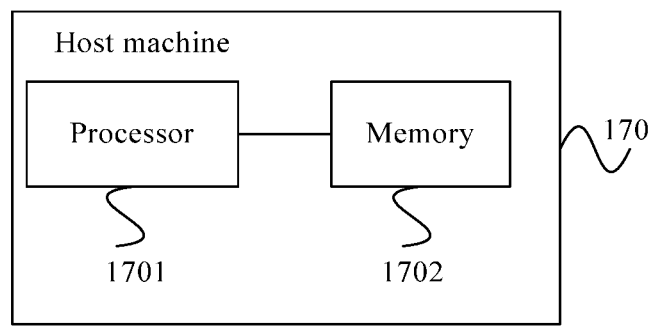
FIG. 17 is a schematic structural diagram of Embodiment 1 of a host machine according to the present disclosure.

FIG. 17 is a schematic structural diagram of Embodiment 1 of a host machine according to the present disclosure. As shown in FIG. 17, a host machine 170 provided in this embodiment includes a processor 1701 and a memory 1702, where the memory 1702 stores an execution instruction, and when the host machine 170 runs, the processor 1701 communicates with the memory 1702, and the processor 1701 executes the execution instruction that is in the memory 1702, to enable the host machine 170 to execute an operation of the technical solutions of the foregoing resource processing methods.

The host machine in this embodiment may be configured to execute the technical solutions of the foregoing virtual machine system management method embodiment according to the present disclosure, and has a similar implementation principle and technical effect, and no detail is repeatedly described herein.

In the several embodiments provided in the present application, it should be understood that the disclosed system and method may be implemented in other manners. For example, the described system embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic, mechanical, or other forms.

Persons of ordinary skill in the art can understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A resource processing method for a multi-core operating system running on a host machine having processor cores, the method comprising:

selecting, by a management operating system, a startup processor core to start up a first load operating system, wherein the multi-core operating system includes the management operation system and multiple load operating systems, the multiple load operating systems including the first operating system, wherein the management operating system pre-allocates, to the first load operating system, a physical resource set exclusively used by the first load operating system, the physical resource set comprising the startup processor core of the processor cores;

sending, by the management operating system, an inter-core interrupt message to the startup processor core, wherein the inter-core interrupt message instructs the startup processor core to execute an initialization program, the initialization program configured to initialize the startup processor core, wherein the initialization program is executed to read a mapping relationship, from a virtual memory address to a physical memory address, for executing a startup mirror of the first load operating system, wherein the mapping relationship is pre-constructed by the management operating system, the physical memory address indicating a location of the startup mirror; and instructing, by the management operating system, the startup processor core to execute the startup mirror of the first load operating system, wherein the startup mirror comprises a startup parameter of the first load operating system, the startup parameter identifying the processor core and the physical memory address pre-allocated to the first load operating system.

2. The method according to claim 1, wherein the method further comprises:

constructing, by the management operating system, the startup mirror for the first load operating system; and setting, by the management operating system for the first load operating system, the mapping relationship for executing the startup mirror.

3. The method according to claim 1, the method further comprising:

acquiring, by the management operating system, available processor cores from the processor cores for a second load operating system of the multiple load operating systems, the second load operating system separate from the first load operating system, wherein the second load operating system comprises a logged-out load operating system, the available processor cores comprising a processor core that has been started up, and wherein the selecting the startup processor core comprises:

selecting, by the management operating system, the startup processor core from the available processor cores when the physical resource set of the first load operating system comprises the available processor cores.

4. The method according to claim 1, wherein the method further comprises:

monitoring, by the management operating system, the first load operating system;

determining, by the management operating system, a type identifier of a physical resource that needs to be reduced for the first load operating system when utilization of a physical resource pre-allocated to the first load operating system is less than a first preset threshold, wherein the type identifier indicates whether the physical resource that needs to be reduced is a processor core resource or a physical memory resource; and reducing the physical resource that needs to be reduced for the first load operating system according to the type identifier.

5. The method according to claim 4, wherein the physical resource that needs to be reduced comprises a processor core or a physical memory resource, and wherein the reducing comprises:

sending, by the management operating system, a resource reducing message to the first load operating system to release the physical resource, wherein the resource reducing message comprises an identifier of the physical resource to be released;

acquiring, by the management operating system, the identifier of the physical resource released by the first load operating system; and adding, by the management operating system, the identifier of the released physical resource to a list of available physical resources in the resource pool.

6. The method according to claim 1, wherein the method further comprises:

monitoring, by the management operating system, the first load operating system;

determining, by the management operating system, a type identifier of a physical resource that needs to be added for the first load operating system when utilization of a physical resource pre-allocated to the first load operating system is greater than a second preset threshold; and adding the physical resource that needs to be added for the first load operating system according to the type identifier, wherein the type identifier of the physical resource indicates whether the physical resource that needs to be added is a processor core resource or a physical memory resource.

7. The method according to claim 6, wherein the physical resource that needs to be added corresponds to one of the processor cores, the adding comprises:

marking, by the management operating system, the one processor core as belonging to the first load operating system;

sending, by the management operating system, a resource adding message to the first load operating system, wherein the resource adding message comprises an identifier of the one processor core that needs to be added; and sending, by the management operating system, a jump instruction to the one processor core, the jump instruction to instruct the one processor core to execute a kernel program of the first load operating system, the kernel program comprising mapping relationships from virtual memory addresses to physical memory addresses required for executing the first load operating system.

8. The method according to claim 6, wherein the physical resource that needs to be added corresponds to a physical memory resource, and wherein the adding comprises:

marking, by the management operating system, a physical memory address as a physical resource that belongs to the first load operating system; and sending, by the management operating system, a resource adding message to the first load operating system to add the physical memory address, wherein the resource adding message comprises an identifier of the physical memory address to be added.

9. The method according to claim 1, wherein the physical resource set further comprises one or more external devices of the host machine, wherein the startup parameter further comprises an identifier of an external device allocated to the first load operating system and a device description information table corresponding to the external device, the method further comprising:

receiving, by the management operating system, a resource reducing request message from the first load operating system, wherein the resource reducing request message comprises a type identifier of a physical resource that needs to be reduced, the type identifier indicating whether the physical resource is a processor core resource, a physical memory resource, or an external device resource; and reducing, by the management operating system, the physical resource for the first load operating system according to the type identifier.

10. The method according to claim 1, wherein the physical resource set further comprises one or more external devices of the host machine, wherein the startup parameter further comprises an identifier of an external device allocated to the first load operating system and a device description information table corresponding to the external device, the method further comprising:

receiving, by the management operating system, a resource adding request message from the first load operating system, wherein the resource adding request message comprises a type identifier of a physical resource that needs to be added, the type identifier indicating whether the physical resource is a processor core resource, a physical memory resource, or an external device resource; and adding, by the management operating system, the physical resource for the first load operating system according to the type identifier.

11. A resource processing method for a multi-core operating system running on a host machine having processor cores, the multi-core operating system includes a management operating system and multiple load operating systems, the multiple load operating system including a first load operating system, the method comprising:

receiving, by a startup processor core of the processor cores for the first load operating system, an inter-core interrupt message from the management operating system, the inter-core interrupt message to instruct the startup processor core to execute an initialization program, the initialization program configured to initialize the startup processor core;

reading, by the startup processor core from the initialization program, a mapping relationship for executing a startup mirror of the first load operating system in a process of executing the initialization program, wherein the mapping relationship specifying a mapping from a virtual memory address to a physical memory address indicating a location of the startup mirror, the mapping relationship pre-constructed by the management operating system, the mapping relationship to enable the startup processor core of the first load operating system to access the physical memory address;

jumping, by the startup processor core of the first load operating system according to an instruction from the management operating system, to the location of the startup mirror;

executing, by the startup processor core of the first load operating system according to the mapping relationship, the startup mirror;

acquiring, by the startup processor core and in a process of executing the startup mirror , a startup parameter of the first load operating system from the startup mirror, wherein the startup parameter comprises identifiers of one or more of the processor cores and an identifier of the physical memory address pre-allocated to the first load operating system; and determining, by the first load operating system according to the identifiers of the one or more processor cores and the identifier of the physical memory address of the first load operating system, a physical resource set that is pre-allocated by the management operating system to the first load operating system, the physical resource set comprising at least one of the processor cores and a part of a physical memory of the host machine.

12. The method according to claim 11, wherein the method further comprises:

constructing, by the first load operating system, mapping relationships from virtual memory addresses to physical memory addresses for executing the first load operating system ; and accessing, by the one or more processor cores of the first load operating system, the physical memory address according to the mapping relationships for executing the first load operating system.

13. The method according to claim 11, wherein the method further comprises:

executing, by the first load operating system by using the one or more processor cores allocated to the first load operating system, a privileged instruction delivered by the management operating system.

14. The method according to claim 11, wherein the method further comprises:

monitoring, by the first load operating system, a physical resource of the first load operating system;

sending, by the first load operating system, a resource reducing request message to the management operating system when the first load operating system determines that utilization of the physical resource of the first load operating system is less than a first preset threshold, wherein the resource reducing request message comprises a type identifier of a physical resource that needs to be reduced, the type identifier indicating whether the physical resource that needs to be reduced is a processor core resource or a physical memory resource.

15. The method according to claim 14, wherein the physical resource that needs to be reduced is a processor core or a physical memory resource, the method further comprising:

receiving, by the first load operating system, a resource reducing message from the management operating system to release the physical resource that needs to be reduced, wherein the resource reducing message comprises an identifier of the physical resource to be released; and releasing, by the first load operating system, the physical resource according to the identifier of the physical resource that needs to be released.

16. The method according to claim 11, further comprising:

monitoring, by the first load operating system, a physical resource of the first load operating system;

sending, by the first load operating system, a resource adding request message to the management operating system when the first load operating system determines that utilization of the physical resource of the first load operating system is greater than a second preset threshold, wherein the resource adding request message comprises a type identifier of a physical resource that needs to be added, the type identifier indicating whether the physical resource that needs to be added is a processor core resource or a physical memory resource.

17. The method according to claim 16, wherein the physical resource that needs to be added corresponds to a processor core, the method further comprising:
  receiving, by the first load operating system, a resource adding message from the management operating system, wherein the resource adding message comprises an identifier of the processor core that needs to be added;
  determining, by the first load operating system according to the identifier of the processor core that needs to be added, a processor core added by the management operating system for the first load operating system; and
  receiving, by the added processor core of the first load operating system, a jump instruction from the management operating system;
  executing, by the added processor core of the first load operating system, a kernel program of the first load operating system according to the jump instruction; and
  reading, by the added processor core of the first load operating system and from the kernel program, mapping relationships from virtual memory addresses to physical memory addresses required for executing the first load operating system, wherein the first load operating system presets, in the kernel program, the mapping relationships for executing the first load operating system.

18. The method according to claim 16, wherein the physical resource that needs to be added is a physical memory resource, the method further comprising:
  receiving, by the first load operating system, a resource adding message from the management operating system, wherein the resource adding message comprises an identifier of a physical memory address that needs to be added; and
  determining, by the first load operating system according to the identifier of the physical memory address that needs to be added, a physical memory address added by the management operating system for the first load operating system.

19. A host machine for running a management operating system and multiple load operating systems, wherein the host machine comprises processor cores, and when the host machine runs, the management operating system is configured to:
  select a startup processor core to start up a first load operating system in the multiple load operating systems, wherein the management operating system pre-allocates, to the first load operating system, a physical resource set exclusively used by the first load operating system, the physical resource set comprising the startup processor core of the processor cores;
  send an inter-core interrupt message to the startup processor core, wherein the inter-core interrupt message instructs the startup processor core to execute an initialization program, the initialization program configured to initialize the startup processor core, wherein the initialization program is executed to read a mapping relationship, from a virtual memory address to a physical memory address, for executing a startup mirror of the first load operating system, wherein the mapping relationship is pre-constructed by the management operating system, the physical memory address indicating a location of the startup mirror; and
  instruct the startup processor core to execute the startup mirror of the first load operating system, wherein the startup mirror comprises a startup parameter of the first load operating system, the startup parameter identifying one or more of processor cores and the physical memory address pre-allocated to the first load operating system; and
  the first load operating system is configured to:
  receive, from the management operating system, the inter-core interrupt message;
  execute the initialization program according to the inter-core interrupt message;
  read the mapping relationship for executing the startup mirror of the first load operating system in a process of executing the initialization program, wherein the mapping relationship is used to enable the startup processor core of the first load operating system to access the physical memory address indicating the location of the startup mirror;
  jump, according to an instruction from the management operating system, to the location of the startup mirror, and execute, according to the mapping relationship, the startup mirror;
  acquire, in a process of executing the startup mirror, the startup parameter of the first load operating system from the startup mirror; and
  determine, according to the identifiers of the one or more processor cores and the identifier of the physical memory address of the first load operating system, the physical resource set that is pre-allocated by the management operating system to the first load operating system, the physical resource set comprising at least one of the processor cores and a part of a physical memory of the host machine.

20. The host machine according to claim 19, wherein the management operating system is further configured to:
  construct the startup mirror for the first load operating system; and
  set, for the first load operating system, the mapping relationship for executing the startup mirror.

21. The host machine according to claim 19, wherein the management operating system is further configured to:
  acquire available processor cores from the processor cores for a second load operating system of the multiple load operating systems before selecting the startup processor core that starts up the first load operating system, the second load operating system separate from the first load operating system, wherein the second load operating system comprises a logged-out load operating system, the available processor cores comprising a processor core that has been started up; and
  select, in the available processor cores, the startup processor core from the available processor cores when the physical resource set of the first load operating system comprises the available processor cores.

22. The host machine according to claim 19, wherein the first load operating system is further configured to:
  construct mapping relationships from virtual memory addresses to physical memory addresses for executing the first load operating system after determining the physical resource set allocated by the management operating system; and access the physical memory address according to the mapping relationships for executing the first load operating system.

23. The host machine according to claim 19, wherein the first load operating system is further configured to:
execute, by using the one or more processor cores allocated to the first load operating system, a privileged instruction delivered by the management operating system.

24. The host machine according to claim 19, wherein the management operating system is further configured to:
monitor the first load operating system;
determine a type identifier of a physical resource that needs to be reduced for the first load operating system when utilization of a physical resource allocated to the first load operating system is less than a first preset threshold, wherein the type identifier indicates whether the physical resource that needs to be reduced is a processor core resource or a physical memory resource; and
reduce the physical resource that needs to be reduced for the first load operating system according to the type identifier.

25. The host machine according to claim 24, wherein the physical resource that needs to be reduced is a processor core or a physical memory resource,
the management operating system is configured to: send a resource reducing message to the first load operating system, wherein the resource reducing message comprises an identifier of the physical resource that needs to be released;
the first load operating system is configured to:
receive the resource reducing message from the management operating system; and
release the physical resource according to the identifier of the physical resource that needs to be released; and
the management operating system is configured to:
acquire the identifier of the physical resource released by the first load operating system; and
add the identifier of the released physical resource to a list of available physical resources in the resource pool.

26. The host machine according to claim 19, wherein the management operating system is further configured to:
monitor the first load operating system;
determine a type identifier of a physical resource that needs to be added for the first load operating system when utilization of a physical resource allocated to the first load operating system is greater than a second preset threshold; and
add the physical resource that needs to be added for the first load operating system according to the type identifier, wherein the type identifier of the physical resource indicates whether the physical resource that needs to be added is a processor core resource or a physical memory resource.

27. The host machine according to claim 26, wherein the physical resource that needs to be added corresponds to one of the processor cores, the management operating system is configured to:
mark the one processor core as belonging to the first load operating system;
send a resource adding message to the first load operating system, wherein the resource adding message comprises an identifier of the one processor core that needs to be added; and
send a jump instruction to the one processor core, the jump instruction to instruct the one processor core to execute a kernel program of the first load operating system, the kernel program comprising mapping relationships from virtual memory addresses to physical memory addresses required for executing the first load operating system; and
the first load operating system is specifically configured to:
receive the resource adding message sent by the management operating system;
determine, according to the identifier of the processor core that needs to be added, a processor core added by the management operating system for the first load operating system; and
receive, by using the added processor core of the first load operating system, the jump instruction from the management operating system;
execute the kernel program of the first load operating system according to the jump instruction; and
read, from the kernel program, the mapping relationships from virtual memory addresses to physical memory addresses required for executing the first load operating system.

28. The host machine according to claim 26, wherein the physical resource that needs to be added is a physical memory resource, the management operating system is configured to:
mark a physical memory address as a physical resource that belongs to the first load operating system;
send a resource adding message to the first load operating system to add the physical memory address, wherein the resource adding message comprises an identifier of the physical memory address to be added; and
the first load operating system is specifically configured to:
receive the resource adding message from the management operating system; and
determine, according to the identifier of the physical memory address that needs to be added, a physical memory address added by the management operating system for the first load operating system.

29. The host machine according to claim 19, wherein the first load operating system is further configured to:
monitor a physical resource of the first load operating system;
send a resource reducing request message to the management operating system when the first load operating system determines that utilization of the physical resource of the first load operating system is less than a first preset threshold, wherein the resource reducing request message comprises a type identifier of a physical resource that needs to be reduced, the type identifier indicating whether the physical resource that needs to be reduced is a processor core resource or a physical memory resource; and
the management operating system is further configured to:
receive the resource reducing request message sent by the first load operating system; and
reduce the physical resource for the first load operating system according to the type identifier.

30. The host machine according to claim 19, wherein the first load operating system is further configured to:
monitor a physical resource of the first load operating system; and
send a resource adding request message to the management operating system when the first load operating system determines that utilization of the physical resource of the first load operating system is greater than a second preset threshold, wherein the resource adding request message comprises a type identifier of a physical resource that needs to be added, the type identifier indicating whether the physical resource that needs to be added is a processor core resource or a physical memory resource; and the management operating system is further configured to:

receive the resource adding request message from the first load operating system; and add the physical resource for the first load operating system according to the type identifier.

* * * * *